United States Patent [19]

Gertz et al.

[11] Patent Number: 5,363,107

[45] Date of Patent: Nov. 8, 1994

[54] STORAGE AND TRANSMISSION OF COMPRESSED WEATHER MAPS AND THE LIKE

[75] Inventors: Jeffrey L. Gertz, Marblehead; Robert D. Grappel, Concord, both of Mass.

[73] Assignee: Massachusetts Institute of Technology, Cambridge, Mass.

[21] Appl. No.: 93,161

[22] Filed: Jul. 16, 1993

[51] Int. Cl.$^5$ .................... G01S 13/95; H03M 7/30
[52] U.S. Cl. .................................. 342/26; 342/58; 395/114
[58] Field of Search ............... 342/26, 58; 395/114

[56] References Cited

U.S. PATENT DOCUMENTS

| | | | |
|---|---|---|---|
| 3,784,737 | 1/1974 | Waehner | 358/133 |
| 4,017,985 | 4/1977 | Heartz | 434/2 |
| 4,520,506 | 5/1985 | Chan et al. | 382/56 |
| 4,667,199 | 5/1987 | Roberts | 342/26 X |
| 4,890,249 | 12/1989 | Yen | 364/578 |

OTHER PUBLICATIONS

J. L. Gertz, "Weather Map Compression for Ground to Air Data Links", Proceedings of the Aeronautical Telecommunications Symposium on Data Link Integration, May 15–17, 1990, Anapolis, Md. pp. 131–140.

R. D. Grappel, "Graphical Weather–Map Compression for ATN Applications", International Civil Aviation Organization, SSR improvements & Collision Avoidance Systems Panel, Data Link Applications, Working Group-3, Mar. 27, 1991, pp. 1–11, 7 pages of figures.

R. R. LaFrey et al., "Impart of Data Link on Cockpit Information", 2nd Symp. on Gen'l. Aviation System, Amer. Inst. of Aeronautics & Astronautics, Wichita, Kan., Mar. 16 and 17, 1992 (15 pages).

Primary Examiner—Gilberto Barrón, Jr.
Attorney, Agent, or Firm—Wolf, Greenfield & Sacks

[57] ABSTRACT

Representing weather data with elliptical or polygonal representations for transmission or reception. Ellipseticity may be determined, vertex coordinates may be shuffled, or polygons may be continuously fillable or filled based on filling flag values. Sides may be replaced within the polygonal representations. Certain storage requirements or transmission orders may be variable.

13 Claims, 11 Drawing Sheets

STORAGE AND TRANSMISSION OF COMPRESSED WEATHER MAPS AND THE LIKE

GOVERNMENT RIGHTS

This patent application concerns an invention in connection with which an agency of the U.S. Government has provided a grant which may provide government rights in the invention. The Federal Aviation Administration has provided support through the Air Force under Inter-Agency Agreement Nos. DTFA01-89-Z-02033, and DTFA01-93-Z-02012.

FIELD OF THE INVENTION

The invention relates to the compression, storage, transmission, reception and decompression of weather maps and the like. More particularly, it relates to weather map compression and decompression for ground-to-air data links.

BACKGROUND OF THE INVENTION

Providing an accurate picture of weather conditions in a pilot's area of interest has been proposed to be a highly useful application for ground-to-air data links. A problem with using data links to transmit such weather pictures is the large number of bits required to exactly specify a weather image. In "Weather Map Compression for Ground-to-Air Data Links", Proceedings of the Aeronautical Telecommications Symposium on Data Line Integration, May 15–17, 1990, sponsored by the FAA and Aeronautical Radio Incorporated in Annapolis, Md., herein incorporated by reference, Dr. Jeffrey L. Gertz presents two compression approaches: A Huffman-Type run length and coding scheme, and an approach called the "Polygon Ellipse" (PE) method.

The Polygon-Ellipse encoding method represents weather regions as ellipses, polygons, and exact patterns. The actual ellipse and polygon parameters are encoded and transmitted. The decoder then redraws the shapes from their encoded parameter values and fills in the included weather pixels. The PE method achieves high levels of compression because most weather regions are roughly elliptical or polygonal, and it generally takes fewer bits to specify the shape parameters of the region than to specify each of the pixels making up the region.

For a pilot's purposes, a weather map made up of an array of between 64×64 (4096) and 256×256 (65,536) pixels is believed to provide sufficient information. Also, such an array is about all that is viewable on a typical aircraft cockpit display. Each pixel can indicate one of the seven National Weather Service weather levels and, thus, may be specified with three bits. A weather map image may therefore consist of between 12,288 and 196,608 bits of information, not counting any data link overhead. The Mode S data link protocols, for example, can only guarantee the transmission of one or two "Extended Length Message" (ELM-1280 bits) per aircraft, per scan. Other data links may be similarly limited. To transmit weather maps using Mode S protocol, for example, could require between a ten-fold and hundred-fold compression.

The present TDWR (Terminal Doppler Weather Radar), ASR-9 (Airport Surveillance Radar), and NEXRAD (NEXt generation weather RADar) radars are designed to provide hazardous weather information to controllers located at the tower or at an enroute center.

SUMMARY OF THE INVENTION

The present invention includes an improved Polygon Ellipse method. In one general aspect, the invention features representing weather data with polygon perimeter information and an indication that indicates whether the information includes a series of shuffled vertex coordinates. The coordinates have varying storage requirements and uniquely define a polygon. This method further includes determining the positions of the sides of the polygon from the series of vertex coordinates, and displaying the polygon on the display. The coordinates may be organized in Two coordinate types with one type encoded with varying length storage requirements. The series may start with the coordinates with the highest and lowest values in one type.

In another general aspect, the invention features receiving a signal including polygon perimeter information and whether it represents a continuous segment fillable polygon. This method also includes filling the polygon with a series of parallel non-colinear continuous line segments in response to an indication that the information represents such a polygon. The indication may distinguish between types of continuous segment fillable polygons, and the polygon may be filled with segments oriented in a manner corresponding to this indication. The types may include horizontally-fillable and vertically-fillable.

In a further general aspect, the invention features generating a polygonal representation of a weather region and determining the position of a new vertex that defines two replacement sides for a sequence of three sides, with its position minimizing a measure of change in area of the polygonal representation. This method also includes determining the position of further new vertices and replacing the sequence that results in the lowest level of the measure of change in area. The measure of change in area may be an approximation determined by the areas of triangles defined by the three sides and the two replacement sides. The determining of the position of the new vertex may differ depending on which of the convex, concave, and convex-concave shapes the three sides define.

In another general aspect, the invention features storing a series of coordinates of locations on a boundary of a weather region and storing a flag value for each of the locations indicating a type of location on the boundary that the coordinates represent. This method may determine the flag value based on whether the location is at an end point of the boundary, whether the location is on an oblique part of the boundary, and whether the location is on a crossing point of the boundary. The method may include displaying the points of the boundary on a display, and filling the boundary based on the flag values. Some of the locations may be approximate locations, and the boundary may be an approximate boundary.

In a further general aspect, the invention features displaying a series of points each corresponding to a stored coordinate of a location on the boundary of a weather region, and filling the region within the boundary based on stored filling flag values corresponding to the stored coordinates. The flag values may represent whether the location is at an end point of the boundary, whether the location is on an oblique part of the boundary, and whether the location is on a crossing point of the boundary.

In another general aspect, the invention features representing some of the parameters of elliptical weather representations with shorter signal lengths than other parameters of the same type and transmitting parameters in an order dependent on the parameter values.

In a further general aspect, the invention features receiving a signal stream including a series of signals defining elliptical approximations representing regions within a weather map. The signals are delimited based on values of previously received parameters from the signal stream, and the elliptical approximations are displayed based on the signals. The delimiting parameters may be based on a distance parameter, which is the distance from the first focus to any point on the boundary and then on to the second focus. The delimiting may also be based on the value of a coordinate of two focuses of each of the elliptical approximations.

In another general aspect, the invention features measuring the ellipseticity of weather regions defined by said weather data by comparing the moments of inertia with the area of each region and determining whether to represent each region with a signal including an elliptical approximation or another type of representation.

The invention is advantageous in that it permits the transmission and storage of weather maps and the like using reduced resources. Such maps may therefore be transmitted using a reduced bandwidth channel. This may allow for transmission of such maps to more vehicles in a given time. Alternatively, transmissions over a fixed bandwidth allocation may convey more meaningful information to the recipient. Furthermore, such methods may be performed with relatively simple computing resources, such as a simple, light-weight, onboard computer. It also allows for a simple ground-based system to prepare transmissions for a large number of recipients.

BRIEF DESCRIPTION OF THE DRAWINGS

FIG. 7b is a plot of a 48 vertex best polygon fit of the data of FIG. 7a;

FIG. 8b is a blank plot illustrating that exact rounding of the ellipse parameters renders null the exact ellipse of FIG. 8a;

DESCRIPTION OF THE PREFERRED EMBODIMENT

Figure 1:
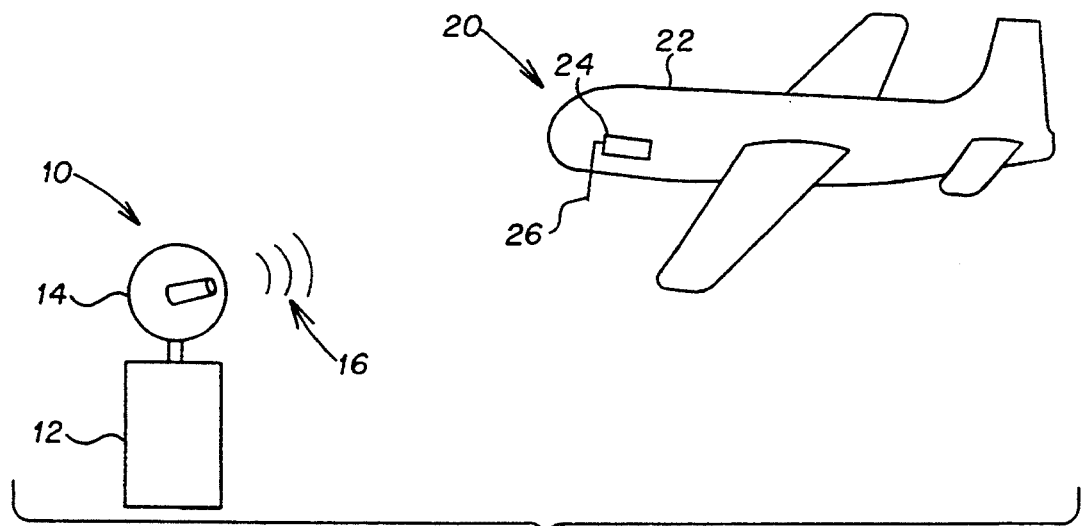
FIG. 1 is a diagrammatic overview of an embodiment according to the invention.

Referring to FIG. 1, an exemplary embodiment according to the invention includes a transmission facility 10 at a transmission location, and a reception area 20 at a reception location. The transmission facility may be located at an airport, and may include a transmission station 12 and a transmission antenna 14. The reception facility may be a vehicle such as an airplane 22, which may include a receiving station 24 and a receiving antenna 26. The transmitting antenna may transmit packets of data 16 via radar, radio, microwaves or other electromagnetic transmission methods for reception by the receiving antenna. This link may be a Mode S link, for example.

Figure 2:
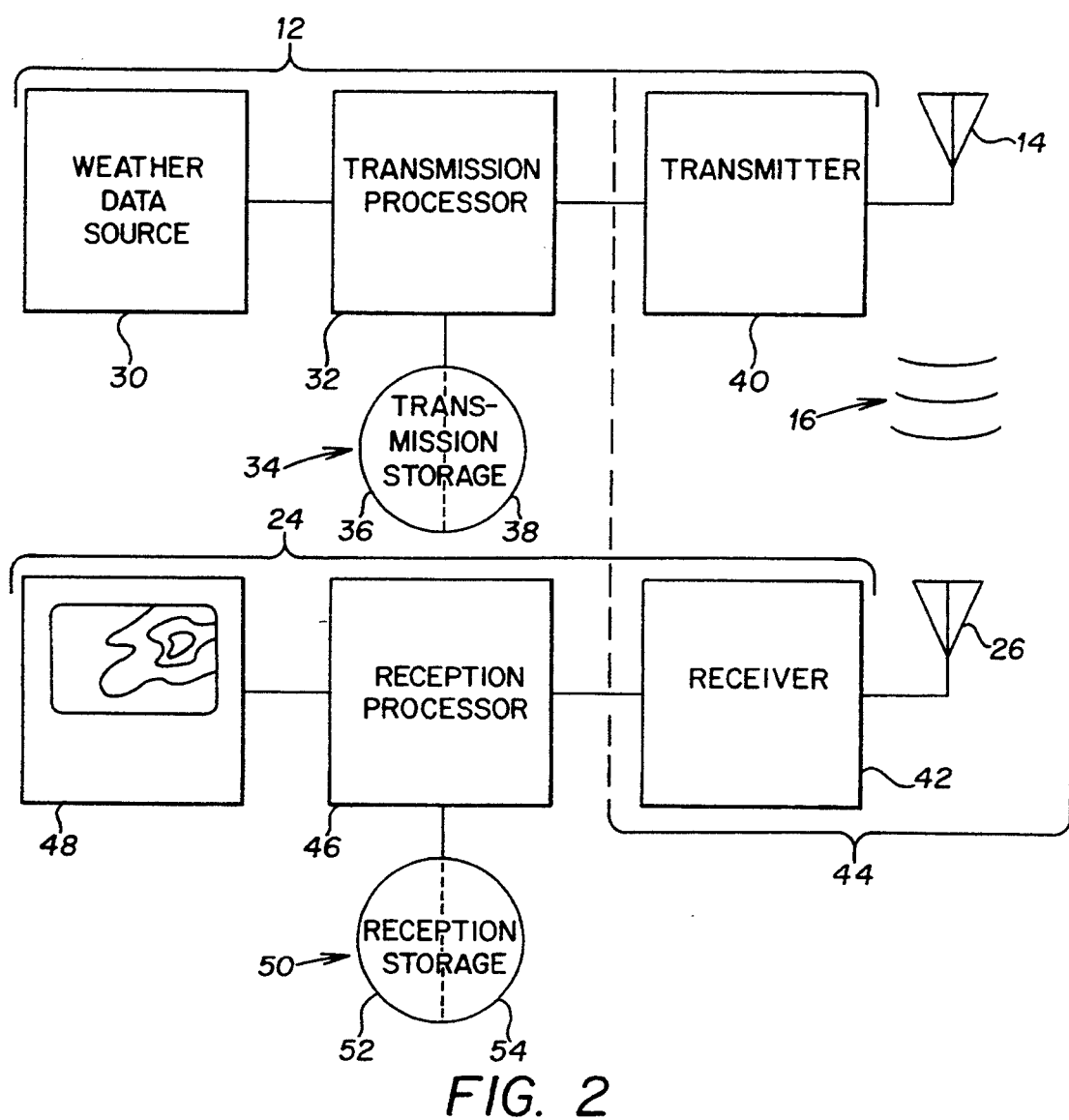
FIG. 2 is a system block diagram for the embodiment of FIG. 1.

Referring to FIG. 2, the transmission station 12 includes a data source 30, such as a weather data source. This weather data source may include local instrumentation, or it may include a receiver for receiving weather data resulting from instrument readings at a remote location. In a preferred embodiment, this weather data source receives a weather radar map in the form of a bit map which uses the seven National Weather Service weather levels encoded with three bits per pixel.

The transmission station 12 also includes a transmission processor 32 and associated transmission storage 34. The transmission processor may be implemented in hardware and/or software, and may include special purpose circuitry, and/or general purpose circuitry. The transmission storage may include one or more of a variety of storage media, including volatile or nonvolatile storage such as magnetic disk storage, semiconductor random access storage, or the like. The storage may be broken up into transmission program storage 36 and transmission data storage 38.

The transmission station 12 further includes a transmitter 40, such as a radio frequency (RF) or radar transmitter. This transmitter forms a part of a data link 44. The data link 44 also includes the transmitting antenna 14, the receiving antenna 26, and a receiver 42, which is included in the receiving station 24. Other formats for the data link may also be used. For example, the data link may also include cables or other electromagnetic transmission means, and combinations of such data links may be used. For example, the weather data source and the transmission processor may be separated from the transmitter by a significant distance, and this distance may be bridged by a telephone line.

The receiving station 24 also includes a reception processor 46, which is generally smaller and lighter than the transmission processor, and a display 48, such as a CRT display, an LCD display, or the like. The reception station 24 further includes reception storage 50, which may be divided into reception program storage 52 and reception data storage 54.

Figure 3A:
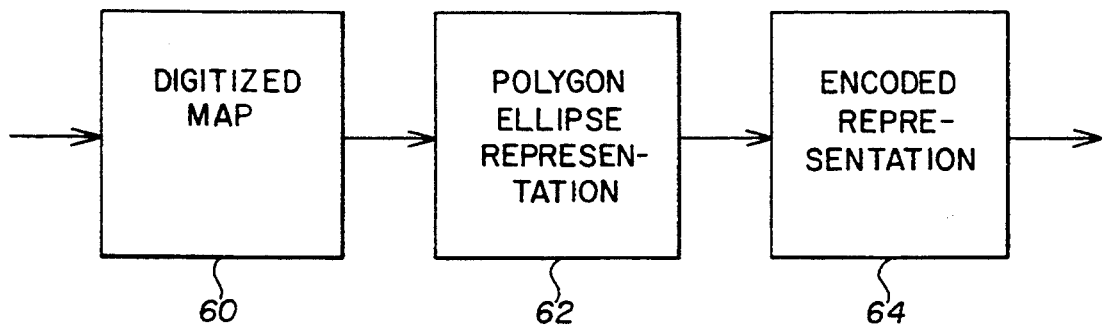
FIG. 3a is a block diagram overviewing the operation of the transmission processor of FIG. 2.

Referring to FIG. 3a, the transmission processor 32 and transmission storage 34 perform the following general functions. A digitized map 60 is stored in the transmission data storage 38. This map is then translated into a polygon ellipse representation 62, which is also stored in the transmission data storage. This polygon ellipse representation is then encoded into an encoded representation 64 for transmission.

Figure 3B:
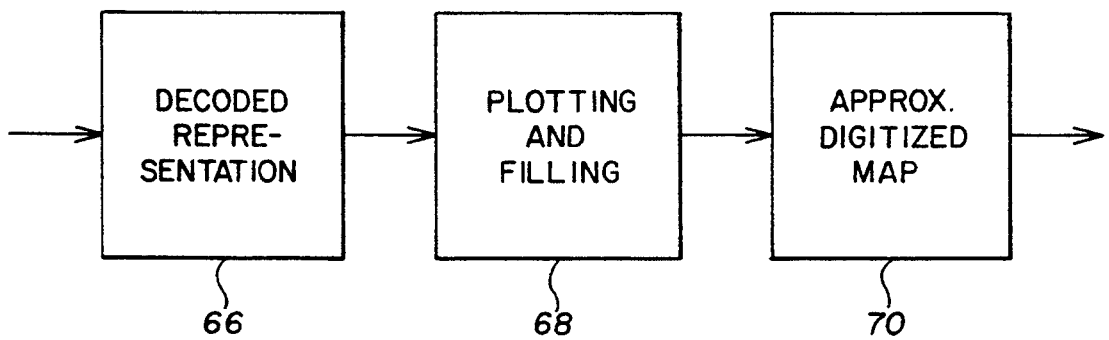
FIG. 3b is a block diagram overviewing the operation of the reception processor of FIG. 2.

Referring to FIG. 3b, the reception processor 46 and reception storage 50 perform The following general functions. First, a decoded representation 66 is obtained from the received signal and stored in reception storage 50. The decoded polygons and ellipses are then plotted and filled 68, and an approximated digitized map 70 is displayed.

Figure 5:
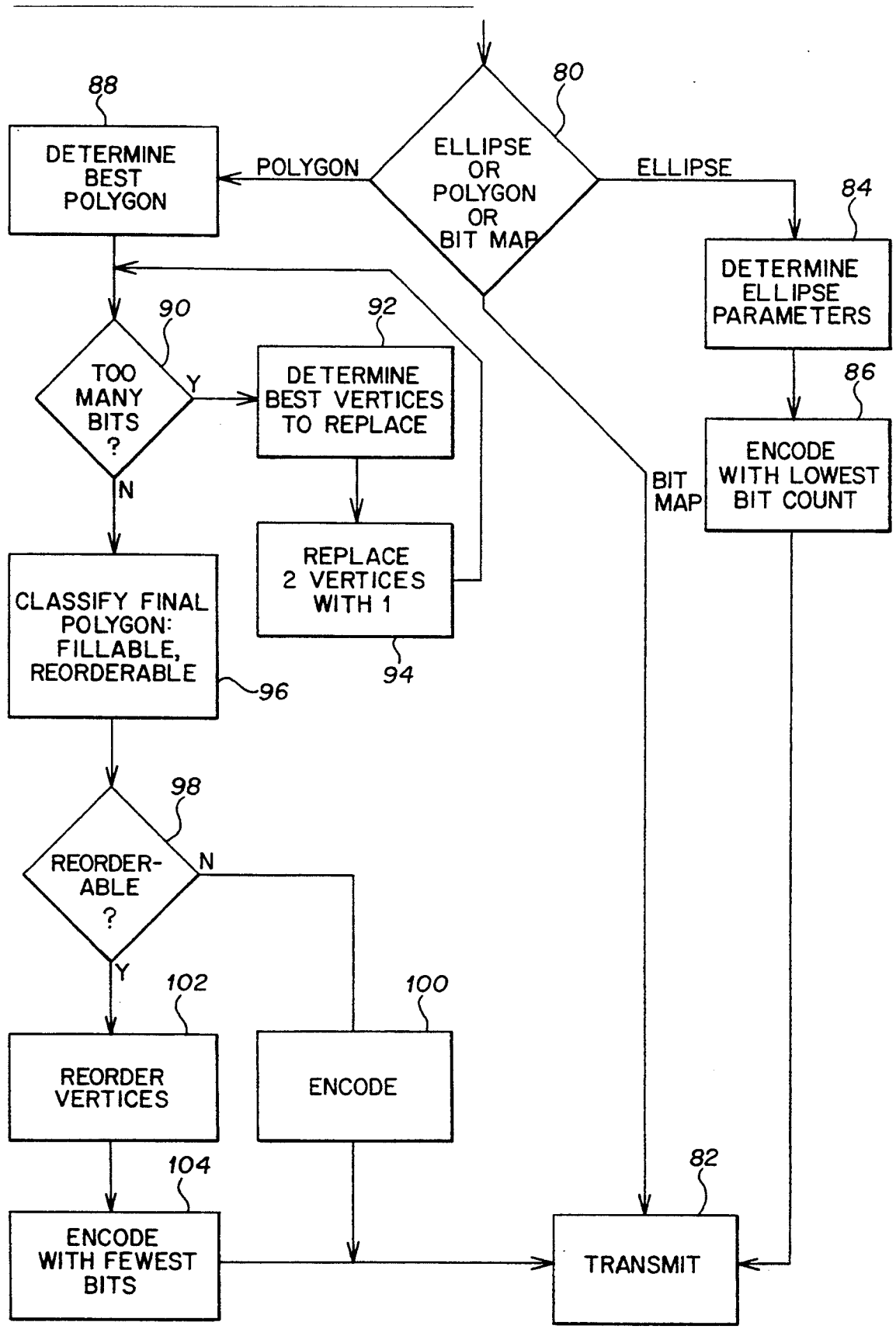
FIG. 5 is a flowchart illustrating the operation of the transmission processor of FIG. 2.

More specifically, referring to FIG. 5, in operation of the transmission station 12, the first step of the improved PE method is the isolation of each weather region of the level L under consideration. A weather region is defined as a set of connected pixels all of which are larger than or equal to L. The higher-level pixels enclosed by the level L weather are included in the region to create closed regions; these pixels will be overwritten with the correct higher level when that level is encoded. A minimum region area threshold is defined for each weather level to permit the filtering out of small spots that would needlessly add to the encoding load.

The weather regions represented by the digitized maps 60 are then evaluated (step 80) to determine whether they are to be represented by ellipses, polygons or bit maps. Weather regions which are too large to be exactly encoded are considered for ellipse representation. A measure of the weather region's "ellipseticity" (i.e., the degree to which the region resembles an ellipse) is made using the moments of inertia of the pixels making up the region. If the region's shape is sufficiently elliptical (within a parameter), it is encoded as an ellipse. If a weather region is not sufficiently elliptical, it is fit with a polygon. The number of polygon vertices allocated to each weather region is a function of the map complexity.

Small weather regions are encoded exactly, with a bit for each pixel:
  1: pixel of level L or higher
  0: pixel of lower level (or clear).

The parameters for the exact shape representation are the locations of the upper-left and lower-right corners of the region. This method of representation is used whenever a calculation determines that it is more efficient than the ellipse or polygon alternatives. These are then transmitted (step 82). If an ellipse representation is chosen to be most appropriate, The parameters of the ellipse are determined (step 84).

In order to encode the ellipse distance (distance from the first focus to the boundary of the ellipse and then on to the second focus) as an integer, yet maintain sufficient accuracy in the rendition of the ellipse, the distance is encoded in $\frac{1}{4}$ pixel units. Therefore, for a 64×64 pixel weather map, an ellipse encoding can require 12 bits for each focus location plus 9 bits for the distance parameter, yielding a nominal total of 33 bits per ellipse. However, special encoding techniques, discussed below, generally reduce this requirement substantially. The ellipse is then encoded with the reduced number of bits (step 86).

Recreating the ellipse in the decoder uses the standard fill method, namely filling in all pixels which satisfy the relation that the sum of the distances from the pixel to the two foci is less than or equal to the ellipse distance parameter d:

$$d(pixel \rightarrow a) + d(pixel \rightarrow b) \leq d$$

The decoder uses several techniques, discussed below, to speed up this operation.

If a polygonal representation is determined to be the preferred representation, the best polygonal representation is then determined (step 88).

The first step of the polygon fitting is a tracing procedure that finds each pixel on the perimeter of The region. The second step approximates this perimeter with line segments, with segment breaks determined by the changes in slope of the perimeter. Finally, the last step is a reduction in the number of vertices until a parametric level of region distortion is reached (this setting is discussed below).

The perimeter tracing process has one significant problem: holes in the region, which are areas of low-level weather entirely surrounded by the higher level weather corresponding to the region, will be lost. When such holes are judged of significant importance, however, an auxiliary hole-fixing method is applied before the tracing. This method identifies The location of each hole, and "drills" a tunnel from the hole through the encompassing region. This transforms the hole from inside to outside the weather region, and thus the perimeter tracing leaves it intact. (The tunnel is noticed and covered by the decoder so that it is unseen by the user).

This polygonal representation is then evaluated (step 90) to determine if it is too long (occupies too many bits). If it is, a determination is made (step 92) as to which are the best vertices to replace.

The polygon-vertex cutting procedure ("polycut") searches the vertex list to find the point that would cause the least amount of error in polygon area if it were omitted, or if it and the subsequent vertex were combined into one Polycut weights overkill errors less than underfill errors based on the judgment that adding a weather area is less dangerous than deleting an area.

The chosen two vertices are then replaced with a single vertex (step 94). A determination (step 90) is then, again, made as to whether the polygonal representation occupies too many bits. If it still does, further vertices are replaced (steps 92, 94). This process may be repeated until the polygon fits within a predetermined bit requirement or until the maximum permissible amount of area has been modified by vertex cutting.

Figure 7A:
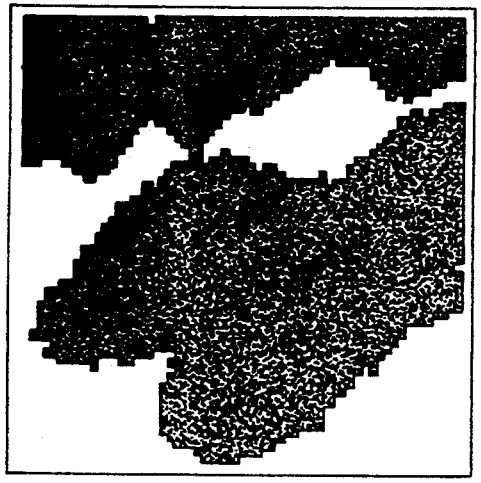
FIG. 7a is a plot of one weather level for radar weather data taken in the Denver, Colo. area.
Figure 7B:
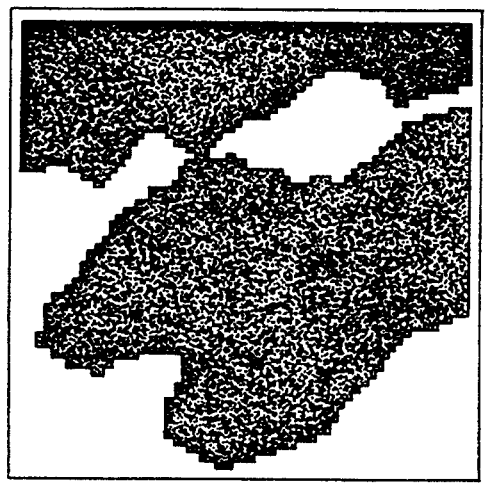
Figure 7C:
FIG. 7c is a plot of a 22 vertex reduction of the polygon fit of FIG. 7b, with a 4% area modification.
Figure 7D:
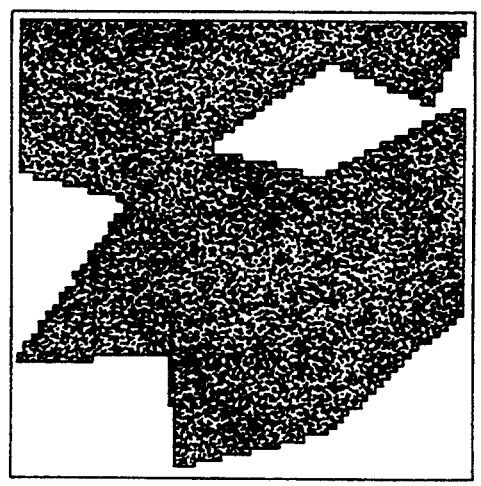
FIG. 7d is a plot of a 14 vertex reduction of the fit of FIG. 7b, with a 10% area modification.

FIGS. 7a–d illustrate the effect on the shade of a plotted weather region as polycut reduces the number of vertices utilized for its representation. FIG. 7a shows the true weather region. FIG. 7b is the initial best polygon fit, containing 48 vertices. Note that if bit reduction is not required, this fit is almost a perfect representation of the region. FIGS. 7c and 7d illustrate the effects of two levels of polycut reduction: the former at 4% area modification, yielding 22 vertices; the latter at 10% area modification, yielding 14 vertices.

Once a representation is obtained that fits within the space requirement, the polygon is classified in two different ways: whether it is fillable or not, and whether it is reorderable or not (step 96). A digital code representing the classifications of the polygon is added to the representation of the polygon in this step. Next a determination is made of whether the polygon is reorderable or not (step 98). If it is not, the vertices of the polygon are encoded as a list of points (step 100). If the polygon is determined to be reorderable, the vertices are reordered (step 102), and the reordered vertices are encoded with a reduced number of bits (step 104). The coded polygons are then transmitted (step 82).

The method for decoding polygons draws the polygon perimeter lines from vertex to vertex, and then fills in the inside pixels. Although this might seem simple, it is complicated by the types of polygons that can result from weather images and from the polycut procedure. Polygons that have lines sticking out, cross-overs, and other unusual cases must be considered. As a result, the generalized polygon-fill procedure involves quite a bit of computation. To speed the process, the polygon encoder performs tests which determine whether a much simpler fill procedure may be used. This information is encoded (in step 96) as part of the polygon header.

In detail, the improved PE approach first attempts to represent the map by its best approximation to exact truth, defined as follows:
 (a) all levels are set to 64×64-pixel resolution,
 (b) the "ellipseticity" parameter is set to 0.98, so that only true ellipses are so encoded, and
 (c) the polygon area modification parameter is set to 0, so that no vertex cutting is permitted.

If the number of bits produced by this attempt exceeds the prescribed limit, fidelity is step-wise reduced. The first several steps lower the ellipseticity requirement of a level while in concert raising its polygon-modification limit. The levels are modified in cyclic order, from lowest to highest priority in each cycle. After all legal parameter changing cycles are exhausted, the levels are one by one converted to 32×32-pixel resolution. Finally, if even this attempt fails to satisfy the bit limit (never yet encountered), levels would be represented by their single enclosing quadrilateral.

Each weather level of the map is encoded separately, and the transmitted message consists of the sequence of level encodings. Whenever bit limitations require resolution reduction for the map, some or all of the levels will be reduced from their input 64×64-pixel resolution to their 32×32 pixel versions prior to the encoding. The priority ordering of the levels for the reduction process can be bottom-up (level 1 reduced first) or top-down (level 6 reduced first) according to application preference.

Typical weather maps, representing light-weather conditions, suffer no smoothing under compression to meet the bit limit. The improved polygon-ellipse method was also used to represent maps that do require smoothing, namely severe weather maps produced at Denver, Colo. Use of the improved polygon-ellipse method on these maps yielded satisfactory results.

The improved PE method has been fully implemented using the C language and a Digital Equipment Corporation MicroVAX 3500 Color Graphics Workstation. (The 3500 is a 3-MIPS minicomputer whose performance can be matched by modern high-capability 32-bit microcomputers). In one embodiment, the method requires almost 5.5 megabytes of memory to execute its compression procedure and about 50 kilobytes to execute its decompression procedure. This includes all code, data areas, and C libraries used. The large amount of memory used for compression is mostly composed of the precomputed data tables and save-areas stored in transmission data storage 38, which is used to increase performance; this requirement could be reduced by a factor of ten if speed were not critical.

The improved PE method was tested on hundreds of severe weather maps derived from data supplied by the ASR-9 and TDWR radars. Timing of the procedures was done with the VAX system clock, accurate to a 10-millisecond quantization. All testing assumed a 1-ELM (1280 bit) limit. The improved PE method, as presently coded and run, required approximately 0.5 seconds on average to encode these severe maps (tests on more typical weather images produced results only one-tenth as long). The decoding routines, on the other hand, required, at most, 0.03 seconds for any complexity of map.

The processing requirements for the airborne data link computer to perform decoding for the improved PE method are quite reasonable:
 onboard memory: 50 kilobytes
 onboard processing: 0.03 seconds
A speed-optimized PE method requires more computer resources to do its encoding procedure, but its requirements are still reasonable for modern ground-based computer systems.

The tradeoffs between high-level and low-level fidelity are not as striking as one might expect. That is because high-weather-level regions tend to be few and small; thus the number of additional bits available to improve low level fidelity by smoothing high levels is often not significant. Which priority scheme is "better" is left for aviation experts to decide.

The improved PE control logic is designed to incrementally degrade the fidelity of the input-weather map representation until the number of bits required to encode the resulting picture first meets the data-link limit. Since each weather level is encoded separately in the improved PE approach, the degradation steps have been designed to affect only one level at a time. The sequence of steps proceeds cyclically through the levels in order to maintain a semblance of equality for the amount of distortion for the levels, with each cycle proceeding from the lowest-priority level to the highest-priority one.

Two diametrically opposed priority schemes are supported by the improved PE software. The first assumes that since higher-weather levels are more dangerous to aircraft, they should be represented most faithfully. With this "normal" scheme, the highest weather level is given the highest-priority assignment, and level 1 the lowest priority. Other people argue, however, that no pilot would go anywhere near severe storms, so approximations to their exact boundaries are acceptable. On the other hand, pilots will try to plot their courses around moderate rain areas, and so the lower levels should be represented as accurately as possible. With this "reverse" scheme, level 1 is assigned the highest priority and the highest-weather level, the lowest priority.

At each successive bit-reduction step, the control logic establishes a new ensemble of values for the critical distortion parameters. For each level, these parameters are (a) level resolution, (b) "ellipseticity" factor (i.e., 2×2-into-1 pixel) and (c) polygon area modification factor. The resolution level can be the full input 64×64-pixels, or be reduced to 32×32 by a 2×2-into-1 pixel mapping.

The ellipseticity factor specifies the least ellipse-like a weather region can be and still be encoded with an ellipse representation. The polygon area modification factor specifies the upper percentage bound to the weather area modification that is allowed as a result of reducing the number of polygon vertices. Because of the cyclic nature of the steps, the parameters for a given level change only when that level's turn to degrade occurs. Each different set of parameters for a level will constitute a new pass through the encoding logic for that level.

Note that the passes can be divided into four categories:
1. Full resolution, ellipses and polygons employed to represent weather regions
2. Reduced resolution, ellipses and polygons employed to represent weather regions.
3. Reduced resolution, only ellipses employed to represent weather regions.
4. Reduced resolution, one quadrilateral used to represent the union of all weather regions.

Each of the first two categories consist of several passes, with the change from one to the next being that more regions become eligible for representation by ellipses (ellipses require fewer bits to specify than polygons, but are often less faithful to region shape), and more distortion is permitted in polygon representations (thus fewer polygon vertices are needed).

The rule that determines which level is next to undergo further distortion, when the bit limit is still not satisfied, is that a lower priority level should always have more distortion than a higher priority level. The method that embodies this apparently simple rule is the following, where, for simplicity, level 1 is assumed to be the lowest priority level:

1. Initialize all levels to pass 0.
2. Set the initial distortion parameters for each level.
3. Encode all levels of the map.
4. If the map encoding bit limit is met, stop.
5. Otherwise, find the largest level L for which Pass(L)≦(Pass(L−1)−2). If none, set L=1.
6. Increment the pass number for level L.
7. Recode level L using its new distortion parameters.
8. Return to step 4.

In words, rule 5 says that a high priority level has its distortion increased only when, by so doing, its distortion still remains less than that of the next lower priority level.

The encoding time implied by this method may be significantly reduced by a simple modification. Namely, map level L is not encoded until the number of bits required to encode levels above L in priority satisfies the bit limit. As soon as the top-down encoding exceeds the limit, the next sequence number applied is the first one that increases the set of passes for the levels already encoded. For example, if the initial sequence 0 encoding fails at level 3, sequence number 6 is utilized next, as this number is the first that increases level-3 distortion. Then, if this recoding of level 3 removes the bit-limit violation, level 2 is encoded at pass 2, skipping the need for prior codings at passes 0 or 1. For very complex maps, it is often found that some of the lower levels never get encoded at 64×64 resolution at all.

Each time the improved PE master control logic increases the distortion parameters for a given level, the weather regions on that level must be reprocessed, and new shape representations and encodings generated. In general, exact specifications, ellipses, and polygons are the available ensemble for the weather regions. The one exception occurs if the number of bits is so severely limited that the entire level must be represented by a single quadrilateral.

The first task to be performed on a single-level map, either the original 64×64 map or the reduced-resolution 32×32 map is the identification of the individual weather regions. This is performed by a labelling operation on the level's non-zero pixels; the details of the labelling are presented below. Since the labelling of a region is independent of the distortion parameters to be applied to the region, it need only be performed once for each map, and the results preserved in memory.

Once the individual regions are known, each one whose size exceeds the minimum parametric value must be encoded by the appropriate type of shape. The shape selected is the legal alternative (the ellipse may be rejected if the region is not elliptical enough) that requires the fewest number of bits. The decision logic is as follows:

1. Calculate $exact_i$, the number of bits required to encode region i by exact specification.
2. Calculate the "ellipseticity" factor $f_i$ of region i and determine the specification parameters of the ellipse that best represents the region.
3. Calculate the number of bits $poly_i$ required to encode the polygon that best represents region i at the specified area-modification distortion level.

4. If $exact_i \leq bpe$ (the estimated fixed number of bits to encode an ellipse), encode region i by exact specification.
5. Else if $f_i \leq F_{p,L}$ (the minimum ellipse factor for pass p at level L), encode the region as an ellipse.
6. Else if $exact_i \leq poly_i$, encode region i by exact specification.
7. Else encode region i as a polygon.

Step 5 is the one that checks for the legality of using an ellipse. Once again, the value of $exact_i$ in step 1 and the "ellipseticity" and ellipse specification parameters of a region in step 2 are independent of distortion parameters, and thus are computed once and stored in memory for future reference. Although the polygon vertices for a region are strongly dependent upon allowable distortion, and so must be recomputed for each pass, the initial tracing of the region need only be performed once; thus the results of this process are also stored in memory.

For the improved PE map-representation approach, each weather level is encoded separately. Thus, the overall encoded message is a concatenation of individual-level encoding streams. Furthermore, since each weather region on a level is encoded separately, the individual-level encoding stream is further subdivided into individual-region encoding representations. The header of the overall encoded message provides two pieces of information:

1. The number of the highest weather level $L_{max}$ that actually exists on the map.
2. The lowest priority level $L_{min}$ that is encoded with full 64×64 resolution.

Note that since the switch from full 64×64 resolution to reduced 32×32 resolution proceeds one level at a time, from lowest priority level to highest priority level, stating the cutoff level $L_{min}$ is sufficient; the resolution of each level does not have to be specified individually.

The header for each of the $L_{max}$ individual levels contains one piece of information: the number of weather regions $R_i$ encoded on level i. This number is 1 if all the regions on the level end up being represented by a single quadrilateral. The header for each of the $R_i$ weather-region specifications on level i indicates whether the region is encoded by exact specification (square or rectangle), by an ellipse, or by a polygon (a quadrilateral is merely a special polygon). To save some header bits, all ellipses are placed at the end of the level list; when the first ellipse is encountered, no further headers are required for the level.

Figure 6:
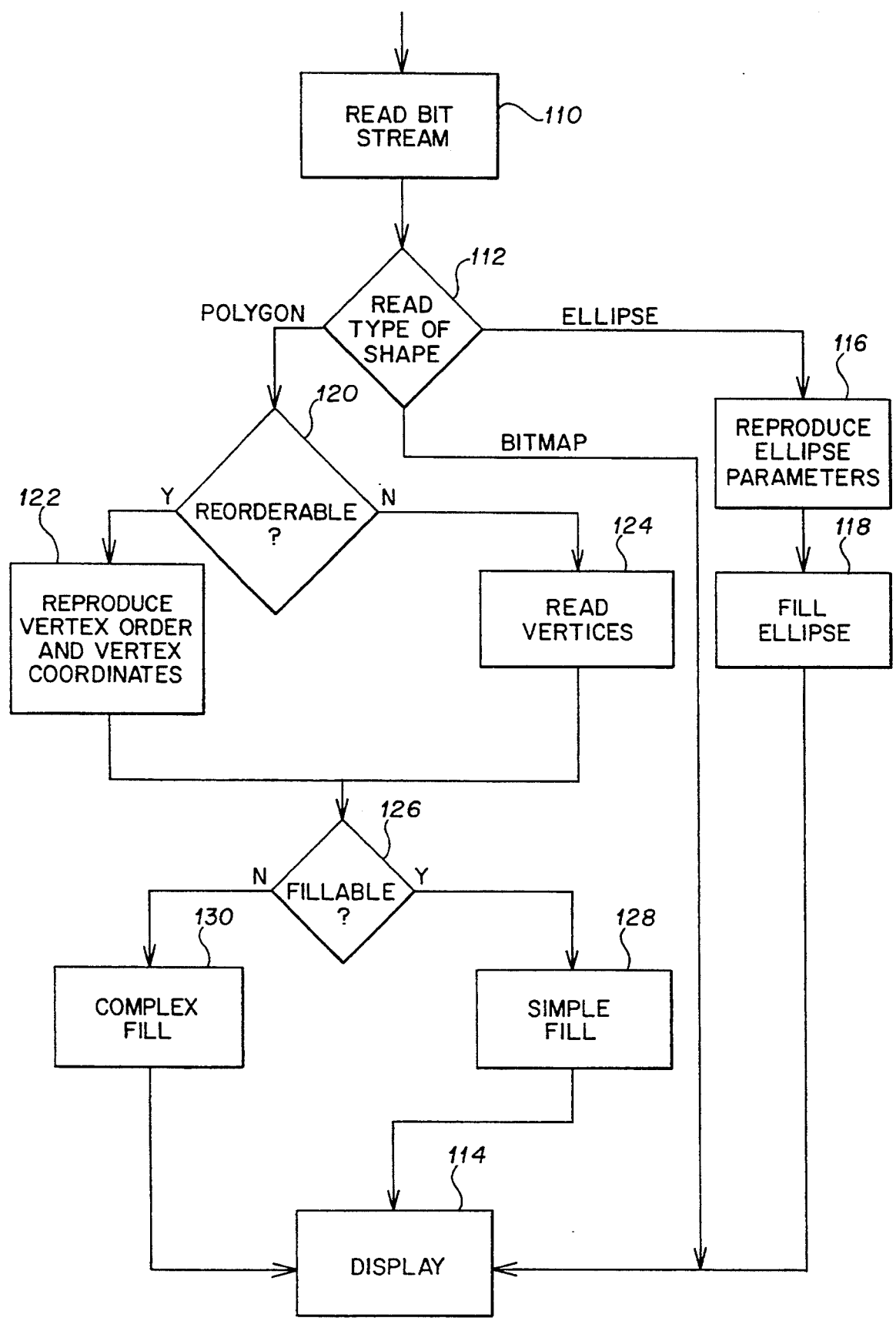
FIG. 6 is a flowchart illustrating the operation of the reception processor of FIG. 2.

Referring to FIG. 6, in operation of the receiving station of an exemplary embodiment of the invention, a received bit stream is first read (step 110). Leading each weather area sequence within the encoded bit stream is an identifying code, which is read (step 112) to determine the type of shape used to represent a weather area. If this representation indicates a bit map, the corresponding bit map is simply displayed (step 114). If the representation indicates an ellipse, the ellipse parameters are retrieved, and decoded to reproduce the full ellipse parameters (step 116). The ellipse is then filled (step 118) and displayed (step 114).

If the representation received is determined to be a polygon, a determination is made (step 120) of whether the polygon is classified as reorderable or not, from classification stored in the polygon representation (see FIG. 5, step 96). If the polygon is determined to be reorderable, the shuffled vertices are reordered to reproduce the vertex order and vertex coordinates (step 122). If the polygon is not reorderable, the system simply reads the vertices from the bit stream (step 124).

Once the vertices for the polygon have been retrieved, a determination is made as to whether the polygon is fillable (step 126). If it is, a simple fill procedure is used to fill the polygon (step 128) and the filled polygon is displayed (step 114). If the polygon is not determined to be fillable, a complex fill procedure is employed to fill the polygon (step 130), and the filled polygon is displayed (step 114).

Recreating the ellipse in the decoder uses the standard fill method, namely filling in all pixels which satisfy the relation that the sum of the distances from the pixel to the two foci is less than or equal to the ellipse distance parameter:

$$d(pixel \rightarrow a) + d(pixel \rightarrow b) < d$$

The improved PE ellipse decoder method uses several techniques to speed up this operation.

The decoding procedure follows from the encoding rules presented earlier. In particular, the steps are as follows:

1. Read V, the value of the first 3 message bits.
2. Set the highest map level to $L_{max} = V$.
3. Read V, the value of the next 3 message bits.
4. Set the lowest priority 64×64 level to $L_{min} = V$.
5. Initialize the level to $L = 1$.
6. Set the number of regions on level L to n = 0.
7. Read V, the value of the next 3 message bits.
8. Increase n by V.
9. If $V < 7$, stop; else if $V = 7$, return to step 7.
10. If $N = 0$, proceed to step 17.
11. Else, initialize the region count to $n = 1$
12. Initialize the specification type to $T = 10$.
13. If $T <> 0$, read V, the value of the next 2 message bits.
14. If $T <> 0$, set $T = V$.
15. If $T = 0$, read and decode the ellipse specification,
    Else if $T = 1$, read and decode the polygon specification,
    Else if $T = 2$, read and decode the square specification,
    Else read and decode the rectangle specification.
16. Increment n by 1; if $n \leq N$, return to step 13.
17. Increment L by 1; if $L \leq L_{max}$, return to step 6, else stop.

Preparation of weather maps will now be discussed in more detail. The fill procedure for each newly decoded shape overwrites whatever values are currently contained in the filled pixels. Since the levels are decoded in order of intensity, this overwriting guarantees that each pixel will end up with its proper weather-level setting.

The improved polygon-ellipse method encodes, level by level, each sufficiently large weather region on the input 64×64-pixel, 7-level weather map. In order to proceed, several pre-processing functions must be performed on the map.

1. Produce 6 individual-level 64×64-pixel weather maps, one for each of the non-zero weather levels.
2. Produce 6 individual-level 32×32-pixel weather maps to be used if bit limitations force a resolution reduction for some or all of the weather levels.
3. For each individual-level map, modify weather regions as necessary to preserve weather holes.
4. For each individual-level map, identify and label each separate weather region. The improved PE method performs all its encoding logic on these individual-level maps.

Each single-level map is a 0-1 weather map, with 1 indicating a weather pixel to be encoded and 0 representing no weather. In each case, the 0 or 1 refers only to the point of view of the specific level being represented by the map; the original input map could indicate a lower level weather present at a 0 of a single-level map.

In general, weather tends to be nested, with more severe levels contained within lower levels. Thus, if the level 1 single-level map did not include higher weather levels as counted points, the weather regions would tend to be toruses. Attempting to represent a torus by an ellipse of equal area would produce a very poor match; the middle hole would be covered by the ellipse, while the actual level 1 weather would hardly be represented at all.

For this reason, a "1" on the single-level map is used to represent any pixel having weather at or above the level of the map. Fortunately, adding the higher level weather to the single-level map cannot cause any misrepresentation after final message decoding. The shapes produced when higher level single-level maps are encoded will overwrite the lower level ones at the pixels where the higher level weather exists.

Thus, the procedure for defining a single-level map of level L is to scan the input map M and set the pixels of the new map according to:

$$L_{ij} = \begin{cases} 1 \\ 0 \end{cases}$$

All single-level maps can obviously be produced during a single pass through the original map; if $M_{ij}=P$, $L_{ij}$ is set to 1 for all levels $L > P$.

Also during this process, for each single-level map, the minimum and maximum non-zero pixels for each row are recorded. These variables, minL, i and maxL, i respectively, come in very handy for the later region labelling operations. Note that because of the nesting definition of the single-level maps:

$\min_{L,i} \leq \min_{P,i} \; P \geq L$ $\max_{L,i} \geq \max_{P,i} \; P \geq L$ This permits an optimized approach to setting the row minimums and maximums during the single input map scan. Namely, if $M_{ij}=P$, only the level P values need be adjusted, rather than all levels P and above as might be expected. Then, after the scan is complete, the final values are set top-down by level as:

$$\min_{L,i} = \underset{P \geq L}{\text{Min}} \{\min_{P,i}\}$$

$$\max_{L,i} = \underset{P \geq L}{\text{Max}} \{\max_{P,i}\}$$

Should the input weather map be so complex that the encoding methods are incapable of meeting the message-bit limitation even after all shape simplification measures have been attempted on the 64×64 maps, some or all of the single-level maps must be reduced from 64×64 resolution to 32×32. To produce this reduction, each 2×2 region of the original input picture is mapped into a single pixel of a new 32×32 map; this map then serves as the reference for the single-level 32×32 maps.

Since high-level weather is considered too important to miss, the presence of even a single high-level pixel in the 2×2 region is sufficient to require the new pixel to be set to that value. With lower-level weather, however, a degree of averaging is permissible. To implement these design criteria, each level is assigned a pixel score according to the formula:

$$\text{Score}_L = 5^{L-1}$$

which guarantees that the identity of the highest level weather pixel in the 2×2 region will be maintained (since $\text{Score}_L > 4*\text{Score}_{L-1}$).

Then the setting of the pixel in the reduced map is determined from the sum of the scores of the pixels in the 2×2 region of the original map that it represents. One possible mapping is shown in Table 1, where level 4 is defined to be the level at which the switch to high-level dominance occurs.

TABLE 1

| Setting of 2 × 2 Pixel versus 2 × 2 Score. | |
|---|---|
| 2 × 2 Score | Pixel Level |
| 0–1 | 0 |
| 2–8 | 1 |
| 10–40 | 2 |
| 50–100 | 3 |
| 125–500 | 4 |
| 625–2500 | 5 |
| 3125–12,500 | 6 |

Examples of the application of this table are as follows:

$\begin{bmatrix} 0 & 1 \\ 2 & 1 \end{bmatrix}$ maps to a 1 (averaging allowed at low levels)

$\begin{bmatrix} 2 & 3 \\ 4 & 3 \end{bmatrix}$ maps to a 4 (no averaging allowed at high levels)

The process of constructing the reduced-resolution, single-level maps is undertaken during the same pass through the input map as described above. In particular, the 2×2 region scores are built from the values of each pixel as they are read. When all 4 pixels in any 2×2 region have been scanned, the pixel value for the overall 32×32-pixel map is determined from the sum of its 4 scores. Then, the 0-1 values and the row minimums and maximums for the reduced-resolution, single-level maps are calculated in the same manner as for the single-level 64×64-pixel maps.

In order to encode a weather region, all the pixels in the region must first be identified. The procedure that accomplishes this goal is the map-labelling operation; this operation scans a single-level map row by row, labelling each non-zero pixel with the number of the region to which it belongs. The labelling method described in this section is an enhanced and corrected version of the method presented in Winston, P. J. and B. K. P. Horn, LISP, Second Edition, Reading, Mass.: Addison-Wesley Publishing Company, Chapter 10, 1984.

Each non-zero pixel A (at row i, column j) encountered during the scan is labelled as belonging to a region by referring to the previously set region labels of its three neighbors B, C, and D, defined as follows:

| | column j-1 | column j |
|---|---|---|
| row i-1 | C | B |

-continued

|       | column j-1 | column j |
|-------|------------|----------|
| row i | D          | A        |

If all three neighbors of A are zero, a new region is started with pixel A by assigning it the next sequential number. Otherwise, A is labelled using the label of a non-zero neighbor; if two or more are non-zero, the order of priority is to use C, then B, and finally D.

The one complication in this approach occurs when C is zero and B and D have different labels. This indicates that two previously thought disjoint regions are now seen to be connected. This would occur, for example, when the point indicated below by "?" is encountered:

| 1 | 1 | 1 | 0 | 0 | 2 | 2 |
| 1 | 1 | 1 | 1 | 0 | 2 | 2 |
| 1 | 1 | 1 | 1 | 1 | ? |   |

The solution to this problem is to maintain equivalence sets of region labels; when the situation B<>D is encountered, a new equivalence entry is created. Note that this equivalence entry between B and D must be made even if the ? pixel is zero, and no labelling need be assigned to it; otherwise regions joined at a right diagonal would incorrectly be thought to be non-connected. Thus, zero pixels cannot just be skipped (contrary to the Winston reference supra.)

To summarize, the labelling method consists of the following rules:
1. If A is zero, leave the label at 0, otherwise if C is non-zero, label A=C, otherwise if B is non-zero, label A=B, otherwise if D is non-zero, label A=D, otherwise assign the next available unused label to A.
2. If C=0, if B 0, and D 0, and B D, record an equivalence between B and D.

Note that the equivalence problem of rule 2 cannot occur if C is non-zero, as a by-product of this method is that any two consecutive non-zero pixels in a row or column will always be labelled as equal or equivalent. Thus, the presence of a non-zero C guarantees B and C are labelled equivalently, as must be C and D, so that B and D are already equivalent by the transitive law of equality.

Since the first and last weather pixels in a row, $min_i$ and $max_i$, are known, a few simplifications to the pixel-by-pixel scan are possible. In particular, empty rows can be skipped, and the pixels in a row following an empty row need only be compared to the D pixel.

As each weather region is labelled, its area is determined. Although the region will in general contain pixels at various weather levels, only the pixels at the level of the specific single-level map are of interest when determining whether a region's area satisfies the minimum size requirement; higher-level pixels will be re-encoded when their own level maps are considered.

After all labelling is completed, the label of each non-zero pixel is replaced by the lowest number in its sub-region's equivalence class. For example, if an equivalence set is (2,4,11), all pixels labelled 4 or 11 are set to 2. This simplifies future processing by insuring that all pixels in a region have the same label. Also, the size of the region is determined as the sum of the sizes of all the equivalenced sub-regions.

Figure 9:
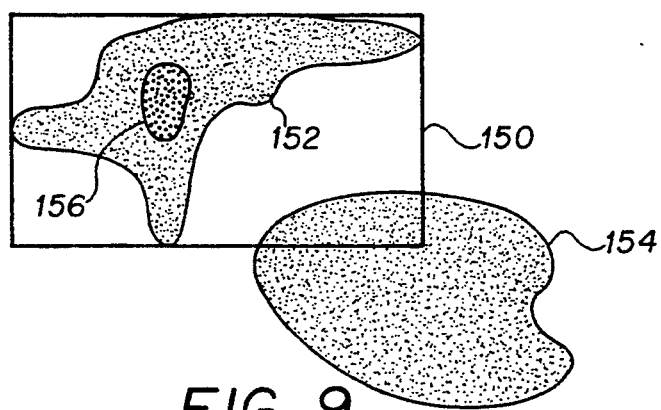
FIG. 9 is a plot of exemplary weather regions, and an associated encompassing rectangle.

Referring to FIG. 9, for small weather regions, it is more bit efficient to simply specify the state of each pixel, 0 or 1, than it is to encode the region by an ellipse or polygon. Two shape specifications have been defined for such regions: a square and a rectangle. The following paragraphs present the methods that implement these shape representations.

In order to locate either a square or a rectangle on the map, the coordinates of the upper left corner of the figure and the dimensions of the figure are provided. The advantage of the square over the rectangle is that only one length, not two, need be encoded. Thus it will occasionally be more efficient to enlarge the shorter dimension of a rectangular weather region to permit the use of the square shape representation. For example, a weather region whose pixels are contained within a 2×3 rectangle can be converted to a 3×3 square by "unnecessarily" including an additional 3 pixels within the region.

Rather than always having to compute whether a square or a rectangle is more desirable for a particular weather region, the method adopted makes the following firm decision:
if the longer side of the weather region is 4 or fewer pixels,
use a square,
otherwise use a rectangle.

This rule has the added advantage of allowing us to save bits for the square representation, as now only 2 bits are required for its length field.

In actuality, only non-zero pixels contained within the weather region 152 being represented need be encoded. If the encompassing square or rectangle 150 covers part of another region 154, such as is shown in FIG. 9, that second region will be encoded by its own shape.

However, since that other shape will in general not be exact, encoding all non-zero pixels found within the square or rectangle boundary will add to the fidelity of the decoded map.

Similarly, non-zero pixels 156 that represent a higher weather level could be encountered within the exact-encoded weather region. In theory, encoding these pixels now will serve no useful purpose, as they should be encoded again and overwritten when their own level is processed. However, if that level's shape encoding were to miss any of these pixels, they could be left blank on the output map. Including them in the exact specification provides an answer closer to The true level than the level 0 that might be seen otherwise.

The encoding logic for small weather regions is quite simple and straightforward:
1. Determine the minimum and maximum rows. $r_{min}$ and $r_{max}$, of the weather region, and set $\Delta R = r_{max} - r_{min}$.
2. Determine the minimum and maximum columns, $c_{min}$ and $c_{max}$, of the weather region and set $\Delta C = c_{max} - c_{min}$.
3. Let $\Delta M = \text{Max}(\Delta R, \Delta C)$.
4. If $\Delta M$ is 4 or smaller, encode a square having a side of length $\Delta M$,
   otherwise encode a rectangle having length $\Delta R$ and width $\Delta C$.
5. Encode the coordinates $r_{min}$ and $c_{min}$.
6. One by one, encode each of the pixels within the extent of the selected shape. The rectangle length and width dimensions are encoded in 15 unit chunks, because then only 4 bits instead of 6 are required for the vast majority of situations. This implies that the number of bits required to encode these dimensions varies with the actual measurement extents.

In decoding exact shapes, step 15 of the map-decoding procedure described earlier is used to determine if a square or rectangle has been encoded. The square shape decoding scheme, to read the dimension, location, and pixel values of the small (at most 4×4) weather region being represented, consists of the following steps:

1. Read V, the value of the first 2 message bits.
2. Set $\Delta M = V + 1$.
3. Read V, the value of the next 6 message bits.
4. Set the upper row index $r_{min} = V + 1$.
5. Read V, the value of the next 6 message bits.
6. Set the left column index $c_{min} = V + 1$.
7. If DM=1, set the pixel at $(r_{min}, c_{min}) = 1$, stop.
8. Read the next $\Delta M * \Delta M$ message bits b1, b2, ..., b$\Delta M * \Delta M$ and use them to set the values of the pixels in the square from $(r_{min}, c_{min})$ to $(r_{min}+\Delta M, c_{min}+\Delta M)$. Note in step 7 that the pixel in a 1×1 weather region must be a 1, so that it need not be encoded. The decoding scheme for a rectangle is somewhat more complex since, as discussed above, its dimensions are given incrementally. The steps in this case are:

1. Set $\Delta R = 1$.
2. Read V, the value of the next 4 message bits.
3. Increase $\Delta R$ by V.
4. If V<15, go to step 5; else if V=15, return to step 2.
5. Set $\Delta C = 1$.
6. Read V, the value of the next 4 message bits.
7. Increase $\Delta C$ by V.
8. If V<15, go to step 9; else if V=15, return to step 6.
9. Read V, the value of the next 6 message bits.
10. Set the upper row index rmin=V+1.
11. Read V, the value of the next 6 message bits.
12. Set the left column index cmin=V+1.
13. Read the next $\Delta R * \Delta C$ message bits b1, b2, ..., b$\Delta R * \Delta C$ and use them to set the values of the pixels in the rectangle from $(r_{min}, c_{min})$ to (rmin+$\Delta R$, cmin+$\Delta C$).

The various procedures that together constitute the method for best representing a weather region by an ellipse are now presented. The ellipse that best represents a weather region is defined to be the one that matches the region's major shape parameters. In particular, the ellipse and the region will have the same:

1. Center $x_0, y_0$
2. Area A
3. Orientation angle $\Theta$ of main axis
4. Ratio of along-axis to cross-axis moments of inertia $L_a/L_c$ The fourth point is equivalent to providing the same elongation or eccentricity for the ellipse and weather region.

The parameters of the weather region are determined by scanning the single-level map row by row to determine the pixels included within the region. Let:

pi,j=1, if row i col j is in the region; 0, otherwise

Then the row, column, and diagonal sums of the region are given by:

$$R_i = \sum_{j=1}^{n} p_{ij} \quad i = 1,n$$

$$C_j = \sum_{i=1}^{n} p_{ij} \quad j = 1,n$$

$$D_k = \sum_{i=1}^{n} p_{i,k-i} \quad k = 2, 2*n$$

The area and center of the region can then be computed directly from these sums as follows:

$$A = \sum_{i=1}^{n} R_i$$

$$x_0 = \frac{1}{A} \sum_{i=1}^{n} i * R_i$$

$$y_0 = \frac{1}{A} \sum_{j=1}^{n} j * C_j$$

Next, the orientation angle of the region's major axis is calculated by the following set of steps:

$$s1 = \sum_{i=1}^{n} i^2 * R_i$$

$$s2 = \sum_{j=1}^{n} j^2 * C_j$$

$$s3 = \sum_{k=2}^{2*n} k^2 * D_k$$

$$a = s1 - A * x_0^2$$
$$c = s2 - A * y_0^2$$

$$b = \frac{1}{2}[s3 - (s1 + s2)] - A * x_0 * y_0$$

$$\Theta = \frac{1}{2} atan\left(\frac{2*b}{a-c}\right)$$

Finally, the along-axis and cross-axis moments of inertia of the region are given by:

$$L_a = \frac{a+c}{2} - \frac{\sqrt{(2b)^2 + (a-c)^2}}{2}$$

$$L_c = \frac{a+c}{2} + \frac{\sqrt{(2b)^2 + (a-c)^2}}{2}$$

Figure 4:
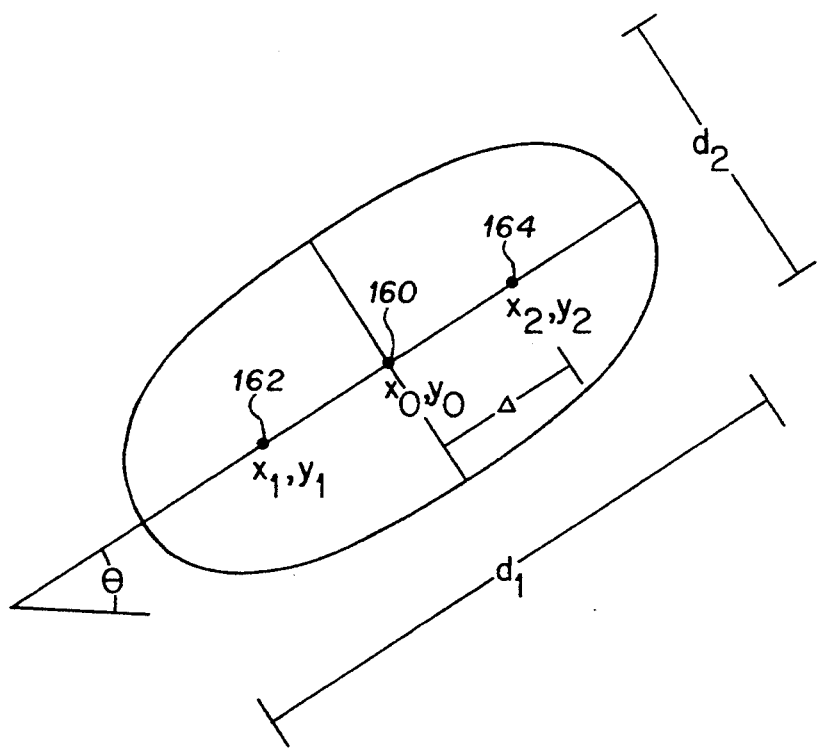
FIG. 4 is a diagram illustrating an ellipse and its parameters for use with the embodiment of FIG. 1.

Referring to FIG. 4, the definitions of the ellipse parameters for a typical ellipse located on the map coordinate system include the locations of the ellipse's center 160 ($x_0$, $y_0$), its first focus 162 ($x_1$, $y_1$) and second 164 ($x_2$, $y_2$) foci, the lengths of its major $d_1$ and minor $d_2$ axes, and its orientation angle $\Theta$.

The ellipse can be mathematically defined as the locus of all points x,y satisfying:

$$\sqrt{(x-x_1)^2 + (y-y_1)^2} + \sqrt{(x-x_2)^2 + (y-y_2)^2} = d_1$$

In words, an ellipse is the set of points the sum of whose distances from two fixed points is a constant; the two points being the foci of the ellipse, and the distance sum being the length of its major axis. The formula for the area of an ellipse is the generalization of the formula for the area of a circle:

$$A = \pi \frac{d_1}{2} \frac{d_2}{2} \quad (1)$$

Similarly, the along-axis and cross-axis moments of inertia are the circle generalizations:

$$L_a = A \frac{1}{4} \left(\frac{d_2}{2}\right)^2 \quad (2)$$

$$L_c = A \frac{1}{4} \left(\frac{d_1}{2}\right)^2 \quad (3)$$

Note that the product of the moments of inertia can be expressed in terms of the area as follows:

$$L_a * L_c = \frac{A^4}{16\pi^2} \quad (4)$$

Now define a factor to be named the area-to-inertia factor or more simply the k-factor:

$$k = \frac{A}{2\sqrt{\pi \sqrt{L_a * L_c}}} \quad (5)$$

This factor is clearly 1.0 for an ellipse by the way it was defined using (2) and (3). Since the ellipse has the largest area relative to its moments of inertia for any geometric figure, any other shaped region will have a k-factor less than 1.0. In particular, from (5), we can write:

$$A = 2\sqrt{\pi \sqrt{k^2 L_a * k^2 L_c}}$$

and thus conclude that for an ellipse and a general region to have the same area and elongation factor (ratio of moments of inertia), the moments of inertia of the ellipse must be a factor of k2 smaller than those of the region.

In summary, the magnitude of a region's k-factor can be used to measure its ellipseticity. This fact is used in the shape-fitting in deciding how realistically an ellipse can represent a given weather region. In the improved PE method, the region whose k-factor is 0.98 will always be represented by an ellipse; the other regions will be represented by a polygon if sufficient bits exist.

With this background, it is now possible to calculate the parameters $x_1$, $y_1$, $x_2$, $y_2$, and $d_1$ of the ellipse that, by the stated criteria, best represents a weather region. First, the ellipse and region must have the same center:

$X_0 = X_{region}$
$y_0 = y_{region}$

Then, the lengths of the ellipse axes can be computed by (3) and (4) and the interpretation of the k factor to be:

$$d_1 = 4 * k * \sqrt{L_c/A}$$

$$d_2 = 4 * k * \sqrt{L_a/A}$$

Since the endpoint of the minor axis is on the ellipse, it must satisfy the ellipse equation. Thus, by symmetry:

$$\left(\frac{d_2}{2}\right)^2 + \Delta^2 = \left(\frac{d_1}{2}\right)^2, \text{ or} \quad (6)$$

$$\Delta = \sqrt{\left(\frac{d_1}{2}\right)^2 - \left(\frac{d_2}{2}\right)^2}$$

Finally, the foci are located at a distance D from the center along the region's major axis, which is at the previously computed orientation angle Q:

$x1 = x0 - \Delta * \cos(\Theta)$
$y1 = y0 - \Delta * \sin(\Theta)$
$x2 = x0 + \Delta * \cos(\Theta)$
$y2 = y0 + \Delta * \sin(\Theta)$ This is a simple and compact method for defining an ellipse is to specify the locations of its two foci and the length of its characteristic distance d. The problem that arises when this approach is used for ellipse encoding is that these parameters are decimal numbers, and only integers (or scaled integers) may be transmitted in a bit string.

The most direct resolution of this problem is to round off the defining values to the nearest integer. Unfortunately, the shape of an ellipse can be very strongly affected by small adjustments to its parameters; in the worst case, the ellipse can even disappear when round-off is applied. The solution adopted to alleviate this effect is to round off the foci coordinates but then re-compute a new distance d that, combined with these new foci locations, produces an ellipse having the same area as the exactly calculated ellipse. This modified value of d is then rounded to the nearest quarter integer.

After rounding the foci coordinates, the new distance D of the modified ellipse becomes:

$$\Delta = \frac{1}{2} * \sqrt{(x_{2r} - x_{1r})^2 + (y_{2r} - y_{1r})^2}$$

where the r subscript indicates rounded values. Now applying formulas (1) and (6), we see that the area can be expressed as:

$$A = \pi * \frac{d}{2} * \sqrt{\left(\frac{d}{2}\right)^2 - \Delta^2}$$

Finally, solving for the modified distance d:

$$d_{mod} = \sqrt{2 * \Delta^2 + \frac{2}{\pi} \sqrt{\pi^2 * \Delta^4 + 4 * A}}$$

Figure 8A:
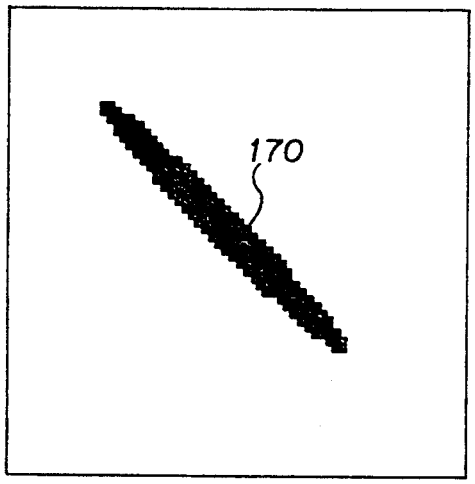
FIG. 8a is a plot of a exact ellipse for use in representing weather regions using the embodiment of FIG. 1.
Figure 8B:
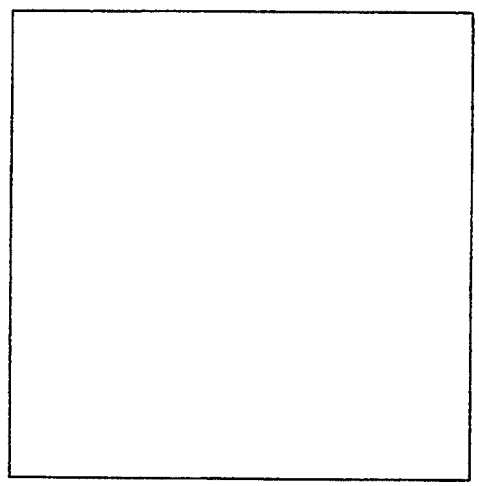
Figure 8C:
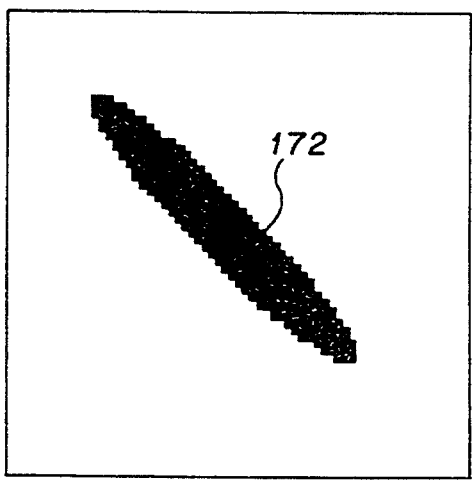
FIG. 8c is a plot of FIG. 8a with modified parameters.
Figure 8D:
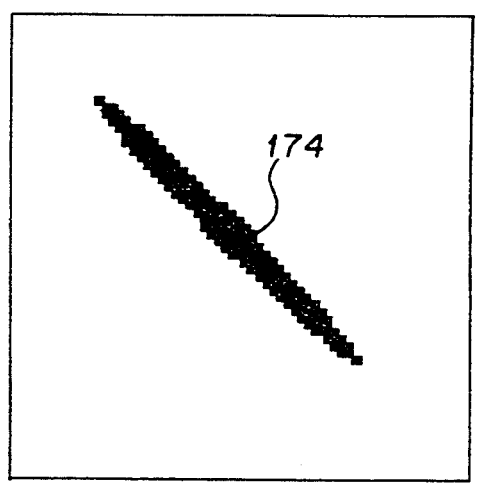
FIG. 8d is a plot of the ellipse of FIG. 8A with modified parameters rounded.

FIGS. 8a–8d illustrate the need for recalculating the distance parameter when roundoff is employed. The ellipse 170 is produced by utilizing the exact ellipse parameters, namely
  focus 1 at location 12.3 by 12.3
  focus 2 at location 48.7 by 48.7
  distance d=51.7
When these values are rounded off to 12, 49, and 52, respectively, the ellipse produced, as shown in FIG. 8b, is null. The recalculation of equation (7) modifies the distance d to the adjusted value of $d_{mod} = 52.54$. FIGS. 8c and 8b present the ellipses 172,174 produced by rounding this new value of d to an integer (54) and a scaled integer (54.50), respectively. Clearly the latter ellipse is the only one that closely matches the originally specified picture.

As discussed earlier, encoding an ellipse consists of transmitting 5 parameter values. For a 64×64-pixel map, having a maximum diagonal of 91, the number of bits required for a straightforward representation of these values would be as follows:

| | | |
|---|---|---|
| focus 1, x coordinate | 1-64 (integer) | 6 |
| focus 1, y coordinate | 1-64 (integer) | 6 |
| focus 2, x coordinate | 1-64 (integer) | 6 |
| focus 2, y coordinate | 1-64 (integer) | 6 |
| distance | 0-91 (¼ integer) | 9 |
| TOTAL | | 33 |

Several bit-reduction techniques are employed in the data compression program to significantly reduce this requirement. First, the ellipses on any given weather level are transmitted in decreasing order of their distance parameter d. Thus, the largest possible value of the current ellipse's d is the value of the previous ellipse's d. If, for example, the list of successive distances are as follows, the number of bits required results in a savings of 8 bits, or 22%.

| d | bits needed to encode |
|---|---|
| 48.75 | 9 |
| 14.50 | 8 |
| 5.00 | 6 |
| 5.00 | 5 |

Next, the foci are ordered so that $x_1 \leq x_2$, and $x_1$ and $y_1$ of the first focus are encoded directly using the full 6 bits. Then the incremental value $x_2 - x_1$ is considered for encoding. Since $x_2$ must be greater than $x_1$ by the ordering method, fewer than 6 bits will be required to represent the increment whenever the first focus is on the lower half of the map; in the best case of both foci on the lowest map row, no bits at all will be required to encode $x_2$.

The final bit-saving method, employed for encoding the remaining value $y_2$, makes use of the fact that the foci can be separated by at most the ellipse distance d (producing a straight line "ellipse"). Thus:

$$\sqrt{(x_2 - x_1)^2 + (y_2 - y_1)^2} \leq d$$

from which it follows that $$y_{2min} = \text{Max}\{1, y_1 - \sqrt{d^2 - (x_2 - x_1)^2}\}$$

$$y_{2max} = \text{Min}\{64, y_1 + \sqrt{d^2 - (x_2 - x_1)^2}\}$$

Therefore, the possible set of values for $y_2$ will often be restricted to a very small range. By computing the extent of this range, the number of bits required to encode the value can be determined. This number of bits is then used to encode the difference $(y_2 - y_{2min})$.

The ellipse-decoding method, to read from the encoded bit stream the ellipse parameters $x_1$ and $y_1$ of focus 1, $x_2$ and $y_2$ of focus 2, and the distance d, is the inverse of the above encoding scheme. Since the decoder will know the techniques used by the encoder, it can generate the proper values by the following steps:

1. Set $d_{previous}$ to 100.
2. Compute $b = \log_2(4 \ast d_{previous})$ rounded up to next integer.
3. Read V, the value of the next b message bits.
4. Set $d = V/4$.
5. Set dprevious=d.
6. Read V, the value of the next 6 message bits; set $x_1 = V + 1$.
7. Read V, the value of the next 6 message bits; set $y_1 = V + 1$.
8. Compute $b = \log_2(64 - x_1 + 1)$ rounded up to next integer.
9. If $b > 0$,
   read V, the value of the next b bits; set $x_2 = x_1 + V$.
   Else set $x_2 = x_1$.
10. Using d, $x_1$, $x_2$, and $y_1$, compute $y_{2min}$ and $y_{2max}$.
11. Compute $b = \log_2(y_{2max} - y_{2min} + 1)$ rounded up to next integer.
12. If $b > 0$,
    read V, the value of the next b bits; set $y_2 = y_{2min} + V$.
    Else set $y_2 = y_1$.
13. Return to step 2 if more ellipses exist for this level.

Once the 5 ellipse parameters $x_1$ and $y_1$ of focus 1, $x_2$ and $y_2$ of focus 2, and the distance d have been decoded, the map fill procedure can be performed in a very straightforward manner: scan the map pixel by pixel and fill in each pixel x, y for which $$\sqrt{(x - x_1)^2 + (y - y_1)^2} + \sqrt{(x - x_2)^2 + (y - y_2)^2} \leq d \qquad (8)$$

However, this scanning procedure can be accelerated considerably with two modifications.

The first modification is to limit the search region to a square guaranteed to encompass all the ellipse fill points. Clearly, using (8), any filled point must satisfy:

$$|x - x_1| + |x - x_2| \leq d$$

Thus the x extent of the fill region must be limited to:

$$\frac{x_1 + x_2 - d}{2} \leq x \leq \frac{x_1 + x_2 + d}{2} \qquad (9)$$

Similarly, the y extent of the fill region must be limited to:

$$\frac{y_1 + y_2 - d}{2} \leq y \leq \frac{y_1 + y_2 + d}{2} \qquad (10)$$

The second modification makes use of the property that ellipses have no interior holes. Thus, on a given row, filled points will extend consecutively from the first to the last. This fact leads to the following minimum time ellipse fill method:

1. Set x to $x_{min}$ as determined from (9).
2. Set y to $y_{min}$ as determined from (10).
3. Increment y until $Y_a$, the first value for which (8) is satisfied.
4. Set y to $y_{max}$ as determined from (10).
5. Decrement y until $y_b$ the first value for which (8) is satisfied.
6. Fill in row x from $y_a$ to $y_b$ inclusive.

7. Increment x by 1.
8. If $x > x_{max}$ as determined from (9), stop; Else return to step 2.

The various procedures that together constitute the method for optimally representing a weather region by a polygon, subject to stated constraints will now be discussed. The definition of optimal is, as expected, the best match between the actual weather region and the interior of the polygon. The constraints, which all translate into distortion of the "perfect" polygon through reduction in the number of its vertices, are required to meet the overall data-link message-bit limit.

Figure 10A:
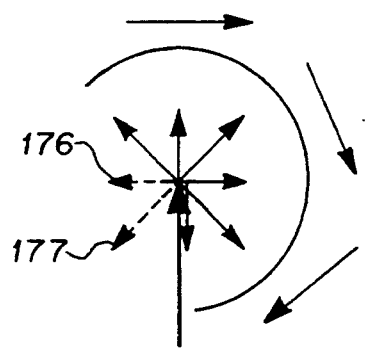
FIG. 10a is a diagram illustrating a search pattern for locating the next contour pixel for the embodiment of FIG. 1 when the last direction was non-diagonal.
Figure 10B:
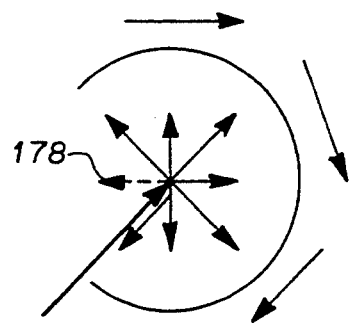
FIG. 10b is a diagram illustrating a search pattern for locating the next contour pixel for the embodiment of FIG. 1 when the last direction was diagonal.

The process of producing the polygon that best encompasses a given weather region has two steps. First, the contour of the region is traced, creating an ordered list of edge points. Then successive points that are co-linear are joined together to form the line segments that become the sides of the polygon. The parameters selected to define the meaning of co-linear implement a tradeoff between fidelity of fit and number of polygon sides, and are set empirically. The tracing step traverses the boundary of the weather region in a clockwise manner. It does this by employing the "leftmost" rule: whenever the current point has more than one neighbor in the region, select the next one to be the one that is the leftmost relative to the last direction of motion. FIGS. 10a and 10b show the order of search when the last direction was non-diagonal and diagonal, respectively. The indicated illegal directions 176, 177, 178 indicate that there are places where region pixels cannot reside; had these neighbors been in the region, they would have been traversed prior to the current point, and the direction of entry to the current point would not have been that shown.

Figure 11A:
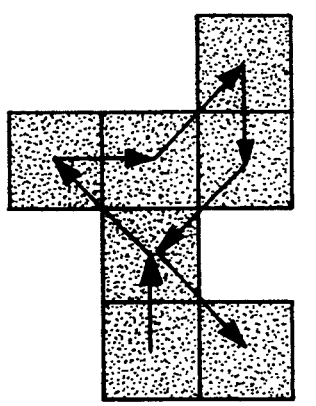
FIG. 11a is a diagram illustrating contour tracing of a first sample region for the embodiment of FIG. 1.
Figure 11B:
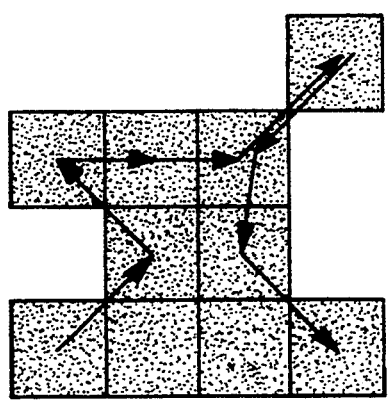
FIG. 11b is a diagram illustrating contour tracing of a second sample region for the embodiment of FIG. 1.

Some examples of the use of this leftmost rule in tracing part of a contour boundary are seen in FIGS. 11a and 11b. Note that a doubling back action is required when an isolated point is reached. Also, note that a point can be entered more than once, but that the exit direction will differ each time because the entrance direction will be different.

The tracing of a weather region is initiated at the "upper left" point of the region, defined as the leftmost point on the uppermost row of the region (even though visually the point could be at the upper right of the region). The initial direction of search is set to "right." The tracing is completed when the sequence of first point followed by second point again appears; just returning to the first point is not a sufficient test because of the possibility of multiple entrances as noted above.

The second step of the polygon formation process is the grouping of co-linear boundary points into the line segments that become the polygon sides. A simple approach would be to add points one by one to the current grouping until the co-linear conditions were first violated. However, this one-at-a-time method would be very time consuming. Instead, a set of $n+1$ successive points (nominally six) are considered at one time. This set is tested for co-linearity, and the following steps taken based on the result:

1. If the set is co-linear, create a new line segment that extends from the first to the last point and proceed to step 3.
2. Otherwise, delete points from the set, starting at the end, to create a smaller set, and return to step 1.
3. Compare the slope of the new line segment to that of the previous line segment.
4. If the slopes are compatible, join the segments into a longer single segment, otherwise leave them separate.
5. Create a new candidate set of $n+1$ points, consisting of point 0 being the last point used to form the newest line segment, and the next n points, and return to step 1.

The test for co-linearity is defined as follows. First, form the line segment that connects the first (0) and last (n) points in the set. Then, for each point in the set, calculate the distance $d_i$ from than point to the nearest part of the line segment. Finally, the set is co-linear if the following two conditions are met:

1. $d_1 \leq D_1$ for all $i$ in the set, and

2. $\sum_{i=0}^{n} d_i \leq D_2$

Figure 12A:
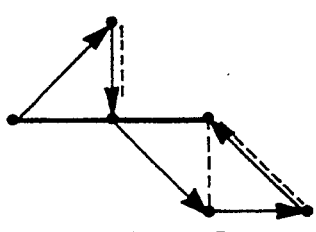
FIG. 12a is a first exemplary diagram illustrating the calculation of distance $d_i$ for the embodiment of FIG. 1.
Figure 12B:
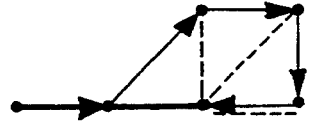
FIG. 12b is a second exemplary diagram illustrating the calculation of distance $d_i$ for the embodiment of FIG. 1.

D1 and D2 are parameters, nominally set to 1.0 and 2.0, respectively. FIGS. 12a and 12b indicate how the values of di are defined for various geometric cases, where the heavy line is the reference line segment.

Note that a point can lie on the extension of the line segment, but because it is "off the end" of the segment, its $d_i$ is non-zero. Thus, the procedure for computing $d_i$ is more complex than just using the standard formula for the distance from a point to a line:

$$d_{line} = \frac{|A^*x_i + B^*y_i + C|}{L}$$

where A, B, and C specify the equation of the line:

$$A^*x + B^*y + C = 0$$
$$A = y_0 - y_n$$
$$B = x_n - x_0$$
$$C = x_0^*y_n - x_n^*y_0$$
and
$$L = \sqrt{A^2 + B^2}$$

Instead, the distances $d_o$ and $d_n$ of the point from each end of the line segment must also be computed:

$$d_0 = \sqrt{(x_i - x_0)^2 + (y_i - y_0)^2}$$

$$d_n = \sqrt{(x_i - x_n)^2 + (y_i - y_n)^2}$$

Then the distance is determined according to the applicable case:

$$d_i = \begin{cases} d_0 & \text{if } d_n^2 > (d_0^2 + L^2) \\ d_n & \text{if } d_0^2 > (d_n^2 + L^2) \\ d_{line} & \text{otherwise} \end{cases}$$

This co-linearity test would appear to be very time consuming. Fortunately, all the work can be performed at program initialization and the results stored in a lookup table. This action is possible because the co-linearity result is totally defined by the set of n directions of movement that connect the $n+1$ points. Thus, at program startup, all 8 n permutations of movement are tested for co-linearity by the above procedure; if co-linearity is obtained, the value 0 is stored in the corresponding table entry, otherwise, the index of the point i whose distance di is greatest is stored. At run time, the n actual directions of movement are used to construct an index into the lookup table. If the table entry is 0, co-linearity is known to exist for the n+1 points; otherwise, if the entry is m, the m+1 initial points of the set are used in step 2 of the above method as the new set to be tested by another table lookup.

Once a new co-linear line segment is identified, the decision must be made as to whether or not to join it with the previous segment to form a longer segment. The new and old segments are compatible and can be joined if their slopes are similar enough. The angular difference q between any two line segments is given by:

$$\cos \theta = \frac{A_1 {}^* A_2 + B_1 {}^* B_2}{L_1 {}^* L_2}$$

If $\Theta$ and $\Theta_{now}$ are, respectively, the slope of the previous segment when it was first formed and the slope of the previous segment at the current-time (after segment joinings, if any, have occurred), and $\Theta_1$ is the slope of the new segment, then the segments are compatible and can be joined if:

$$\cos|\Theta_i - \Theta_{now}| \leq \cos T_1$$

and $$\cos|\Theta_i - \Theta_0| \leq \cos T_2$$

where $T_1$ and $T_2$ are parameters nominally set to 20 and 30 degrees, respectively. In other words, the tests say that the new segment cannot differ from the previous one by more than T1 degrees. Furthermore, if previous joinings have already "bent" the previous line segment, the new segment cannot differ by more than $T_2$ degrees from its original direction.

Finally, after all boundary points have been processed into line segments, the set of segments that then exist constitute the polygon that best represents the weather region. The set of end points of these segments are then taken as the list of polygon vertices that would be transmitted to the user if bit limitations were not present. If, however, bit reduction is required, the vertex reduction method presented next is employed.

Two related procedures are employed to reduce the number of vertices required to specify a region-contouring polygon when bit limitations are present. The simplest one is just-to remove a vertex, while the more complex one is to replace two successive vertices by the single vertex that best matches their contouring effect. In either case, the vertex to select is the one whose removal (or replacement) introduces the least contour distortion.

Figure 13A:
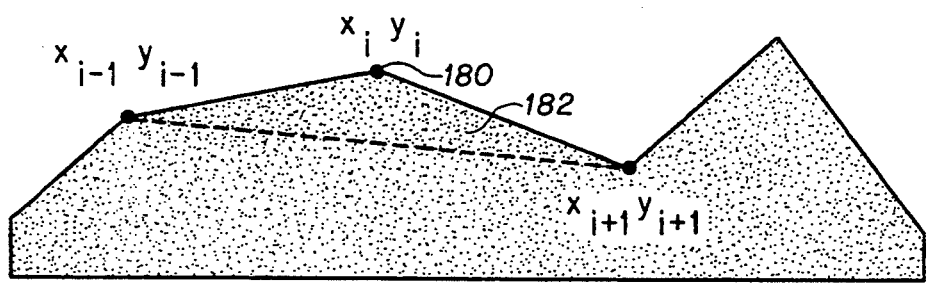
FIG. 13a is a drawing of a first exemplary polygon showing the effect of removing a single vertex in operation of the embodiment of FIG. 1.

Referring to FIG. 13a, distortion, for either approach, is measured by the amount of error, either overfill (pixels added to the true weather region) and/or underfill (pixels removed from the region), added to the polygon approximation as a result of the vertex reduction. Since an actual calculation of distortion would require performing a polygon fill procedure for each existing vertex, an approximate method has been adopted: assume the present polygon is a perfect match to the region and calculate the change made by the removal of each vertex. This procedure only necessitates finding the area of triangles (e.g., 182), and as such is much quicker. The distortion area 182 that results from the removal of a single vertex i (180) is shown in FIG. 13a.

The formula of the area removed when the dotted line is substituted for the two segments is:

$$A = \tfrac{1}{2} {}^* |(xi - xi - 1) {}^* (yi + 1 - yi - 1) - (xi + 1 - xi - 1) {}^* (yi - yi - 1)|$$

The loss of this area can result in the creation of either an underfill or an overfill. The determining factor is whether the angle at vertex i is a convex (inward, as at vertices i−1 and i in the above figure) or concave (outward, as at vertex i+1 in the figure) angle of the polygon respectively. If the polygon is traced clockwise, the angle at vertex i is concave if:

$$(xi - xi - 1) {}^* (yi + 1 - yi) - (xi + 1 - xi) {}^* (yi - yi - 1) > 0$$

and convex otherwise. Finally, creating an underfill is a more serious effect than is creating an overfill, as underfill results in real weather going unreported. Thus the error "charged" to a single vertex for its removal has been empirically set as follows:

E1=A if vertex is convex, and E1=A/2 if vertex is concave

Figure 13B:
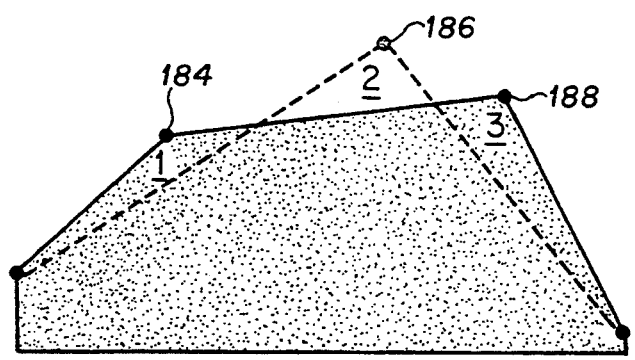
FIG. 13b is a drawing of a second exemplary polygon illustrating a replacement vertex for two convex vertices in operation of the embodiment of FIG. 1.
Figure 13C:
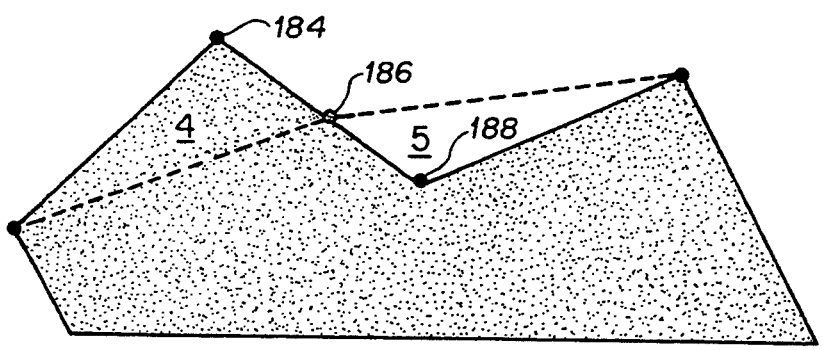
FIG. 13c is a drawing of a third exemplary polygon illustrating a replacement vertex for one convex and one concave vertex in operation of the embodiment of FIG. 1.
Figure 13D:
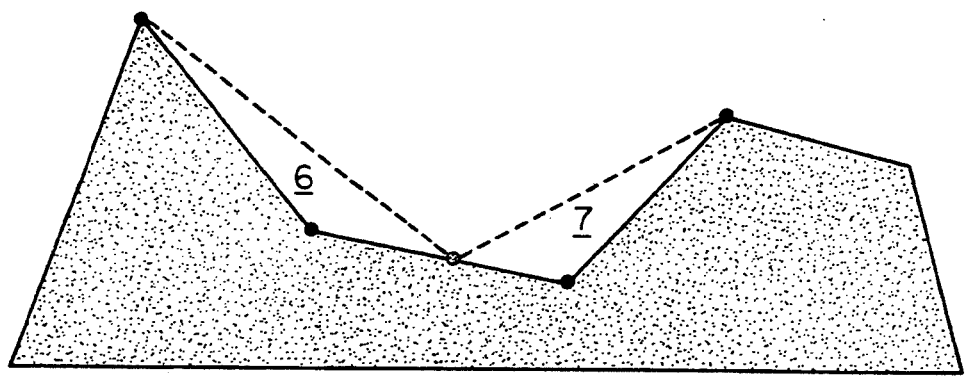
FIG. 13d is a drawing of a fourth exemplary polygon illustrating a replacement vertex for two concave vertices in operation of the embodiment of FIG. 1.

Referring to FIG. 13b-d, the calculation of distortion for the replacement approach is more complex. The method of selecting the new vertex 186 with which to replace a successive pair of existing vertices 184, 188 depends upon the convex or concave nature of the two vertex angles. If both angles are convex, the optimum point, in terms of minimum. distortion introduced, will be located as seen in FIG. 13b.

Since the calculation of the exact coordinates of the optimum replacement point is quite complex, a reasonable approximation is made instead. Draw lines from the two end vertices through the quarter points of the middle line; the intersection of these lines is the selected point. The error area produced by the two-to-one vertex replacement then consists of the three triangles 1, 2, 3 evident from FIG. 13b. Computing the areas of each triangle by the above formula, and noting that triangle 2 in the figure is an overfill while the others are underfills, the total error area becomes:

$$E_2 = A_1 + A_2/2 + A_3$$

When one of the vertex angles is concave, the optimum replacement point calculation will differ considerably from the above case. FIG. 13c indicates a reasonable approximation as the center of the middle line.

This replacement geometry produces an error area consisting of two triangles, an underfill 4 corresponding to the convex vertex and an overfill 5 corresponding to the concave one. Thus, the total error area in this case is:

$$E_2 = A_4 + A_5/2$$

Finally, if both angles are concave, the geometry of the first case could again be employed, this time producing two overfill 6, 7 and one underfill triangle (not shown). However, the more critical underfill error area can be eliminated by using the centerpoint of the middle line as done in the second case, producing the geometry of FIG. 13d.

The total error area in this case then becomes:

$$E2 = (A_6 + A_7)/2$$

The vertex reduction method proceeds, at each step, by performing the action, either vertex removal or vertex pair replacement, that produces the minimum error area. The overall method consists of the following steps:
1. Calculate the removal and replacement areas, $E_{1i}$ and $E_{2i}$, for each vertex i of the polygon.
2. Select the smallest value $E_{min}$ from the combined set of $E_1$ and $E_2$ entries.
3. Perform the indicated removal ($E_{min} \in E_1$) or replacement ($E_{min} \in E_2$) to produce the vertex-reduced polygon.
4. If the reduction criterion has now been satisfied, stop.
5. Otherwise, recompute the values of $E_1$ and $E_2$ that have been changed by the vertex reduction and return to step 2. For step 5, only the neighboring vertices of the one removed (or two replaced) need error recomputations; the geometry of the other points remain unchanged. The reduction criterion referred to in step 4 is the maximum percent distortion that the polygon will be permitted to undergo. Thus if $E_j$ is the error selected at reduction stage j, the process is terminated after s−1 stages when $E_s$ would violate one of the following conditions:

$$\sum_{j=1}^{s} E_j \leq D_1 \text{ * weather region area}$$

$$E_s \leq D_2 \text{ * weather region area}$$

That is, the total error must not exceed D1 percent, and no error may on its own exceed D2 percent of the original weather region area. D1 is the distortion parameter set according to the current pass number of the level being processed while D2 is a constant empirically set at 10%.

One method for presenting a polygon is to list in order the coordinates of its vertices. The decoder then merely has to plot the specified points and "connect the dots" to produce the polygon contour. It would then determine the interior pixels of the polygon by some type of line-crossing procedure and fill in each point so found.

Many polygons, particularly the "normal" convex polygons, have properties that permit a simpler fill procedure to be employed. As demonstrated later, the fill procedure for such polygons is essentially complete once the polygon contour has been drawn.

Figure 14A:
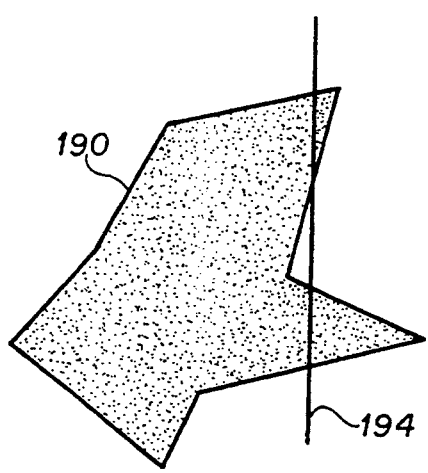
FIG. 14a is a drawing of an exemplary x-fillable and non-y-fillable polygon.
Figure 14B:
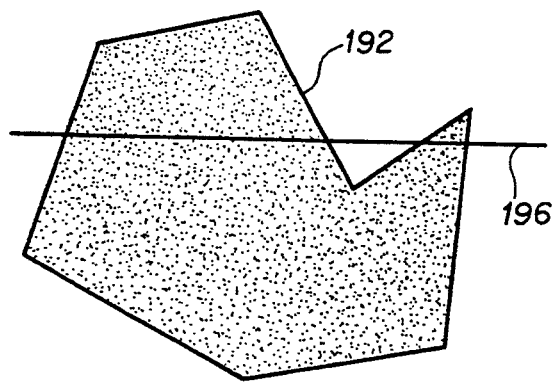
FIG. 14b is a drawing of an exemplary non-x-fillable, y-fillable polygon.

A polygon in reality does not have to be convex to satisfy the requirements of the simple routine. Instead, two types of simple polygons have been defined, "x-fillable" and "y-fillable." The definition of an x-fillable polygon is one that has at most two intersections with any line x=constant; the y-fillable definition is the converse. FIGS. 14a and 14b show examples of non-convex x-fillable 190 and y-fillable 192 polygons, where the lines 194, 196 producing the violations in the other directions are as indicated.

The method for determining whether a polygon is x-fillable from its vertex list is as follows, where n vertices are assumed and $x_i$, $y_i$ are the coordinates of vertex i:

1. Let $(x_m, y_m)$ be the minimum x vertex, defined by $$x_m = \underset{i}{\text{Min}} \{x_i\}$$

2. Let $(x_r, y_r)$ be the maximum x vertex, defined by $$x_r = \underset{i}{\text{Max}} \{x_i\}$$

3. Then the polygon is x-fillable if

| | | |
|---|---|---|
| $x_i \leq x_{i+1}$ | $i = m, m+1, \ldots, r-1$ | all mod n |
| $x_i \geq x_{i+1}$ | $i = r, r+1, \ldots, m-1$ | all mod n |

That is, the polygon is x-fillable if the vertices are always non-decreasing "down the right side" and always non-increasing "up the left side." The definition of y-fillable is the same, with y substituted for x.

Normal polygons also have another property that can simplify the polygon presentation process. Namely, for many of the fillable class of polygons, the vertices can be listed in various shuffled orders, and the decoder can still generate the proper contour if it knows the shuffling method. This fact is clearly true for a convex polygon, in which any random ordering of the vertices is acceptable to the decoder, but convexity is not a necessary condition. The following set of conditions, termed x-reorderable, will permit the n vertices of a polygon to be shuffled in a manner that facilitates bit reduction by the encoder:
1. The polygon must be x-fillable (see above).
2. Let $s_0$ be the reference slope, defined by $$s_0 = \frac{y_r - y_m}{x_r - x_m}$$

3. The vertices down the right side of the polygon, from vertex m+1 to vertex r, must satisfy:

$$\frac{y_i - y_m}{x_i - x_m} > s_0$$

4. The vertices up the left side of the polygon, from vertex r+1 to vertex m, must satisfy $$\frac{y_i - y_m}{x_i - x_m} < s_0$$

The x-fillable condition, as before, states that the polygon vertices cannot double back in the x direction, while the slope conditions state that all vertices on each side of the polygon must be located on their "own side" of the line connecting the minimum and maximum x-coordinate vertices. A sample x-reorderable polygon illustrates this in FIG. 15.

A similar set of conditions is used to define a y-reorderable polygon. A polygon reorderable in one coordinate can be non-reorderable in the other; in fact, the figure above is non-y-reorderable because of doubling back and because the vertex at (42,14) violates the y slope condition. Reorderable polygons are exploited to reduce encoding bit requirements as discussed below.

As discussed above, encoding a polygon consists of transmitting the number of polygon vertices n, and then the x, y coordinate pairs of these n vertices. For a 64×64 map, the number of bits required for a straightforward presentation of the coordinate values would be 6*2*n. However, when the polygon is reorderable by the above definition, this total can often be significantly reduced by a coding technique.

With an x-reorderable polygon, the "left" and "right" vertex lists can be merged into a single list ordered by increasing x coordinate. The decoder will be able to properly unsort this list into its two components by making a slope test on each vertex. Thus, the order of vertex encoding employed for a x-reorderable polygon is:

$x_m, y_m$
$x_r, y_r$
$x_i, y_i$   $i <> m,r$   ordered such that $xi \geq xi-1$ With this ordering, each coordinate xi is guaranteed to fall into the interval $[x_{i-1}, x_r]$. This often permits fewer than 6 bits to be required for its encoding (no bits needed at all if $x_{i-1}=x_r$). For example, the x-coordinate bit requirements for the above example polygon is reduced as seen in Table 2 for a savings of 19 bits, or 35%.

TABLE 2

Figure 15:
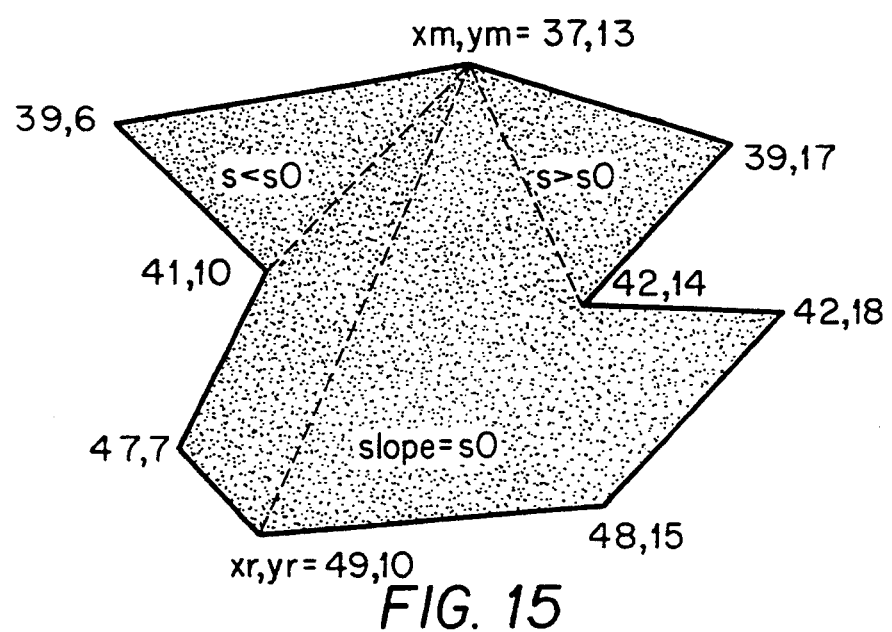
FIG. 15 is a drawing of an example of a x-reorderable polygon.

| | Encoding Requirements for FIG. 15 Polygon. | |
|---|---|---|
| x Value | Interval | Bits Needed to Encode |
| 37 | 1–64 | 6 |
| 49 | 37–64 | 5 |
| 39 | 37–49 | 4 |
| 39 | 39–49 | 4 |
| 41 | 39–49 | 4 |
| 42 | 41–49 | 4 |
| 42 | 42–49 | 3 |
| 47 | 42–49 | 3 |
| 48 | 47–49 | 2 |

The procedure that actually implements the shuffling for an x-reorderable polygon is given by the following steps, where the vertex numbering is cyclic (vertex 0 means vertex n, vertex n+1 means vertex 1, etc.):

1. The first vertex is m, the one having The minimum x.
2. The second vertex is r, the one having the maximum x.
3. If r=m+1, there are no "right side" reports; list the remaining vertices in the order m−1, m−2, ... r+2, r+1; stop.
4. If r=m−1, there are no "left side" reports; list the remaining vertices in the order m+1, m+2, ..., r−2, r−1; stop.
5. Set p=m+1, q=m−1.
6. Compare $x_p$ versus $x_q$.
7. If $x_p \leq x_q$, list p as the next vertex, and increment p. Else list q as the next vertex, and decrement q.
8. Return to step 6 if less than n vertices listed so far.

The information that is encoded for each polygon, and the order in which it is encoded in the message, is as follows:

1. Its category—type of fillable (if either) and type of reorderable (if either).
2. The number n of its vertices.
3. The list of coordinate pairs $x_i, y_i$ of its vertices, with the vertices listed clockwise if the polygon is non-reorderable or shuffled as above if it is reorderable.

The first piece of information requires 1 bit if the polygon is non-fillable, or 3 bits if it is fillable, with the specific encoding logic provided below.

The size of the field required to specify n, if fixed in size, would have to be large enough to handle the maximum possible number of vertices. Rather than waste that many bits, the field has been defined to be of variable size; specifically, n is specified by a series of 4 bit chunks, each of which incrementally encodes as many as 15 additional vertices. The number of chunks c required then becomes:

c=((n−2)+1)/15 rounded up to the next higher integer where the −2 indicates that the first 2 vertices, representing the minimum legal polygon, are "free."

Finally, the vertex list consists of alternate x and y coordinates ordered according to the polygon reorderable type. If non-reorderable, each vertex coordinate x or y requires 6 bits; if reorderable, the number of bits for each reordered coordinate will start at 6 and possibly drop to as low as 0, while the other coordinate will always require the full 6 bits.

A description of the polygon encoding scheme, for all cases and types of polygons, is provided below, in which the bit-by-bit polygon decoding logic is specified.

The form of the polygon decoding method, which is tasked to read the encoded bit stream and produce the clockwise ordered list of polygon vertices, depends upon whether or not the polygon was reorderable. The first steps of the decoding process make that determination:

1. Read V, the value of the first message bit.
2. If V=1, the polygon is fillable; if V=0, it is not fillable, stop.
3. If the polygon is fillable, read V, the value of the next 2 message bits.
4. The polygon type is specified by V as follows:

| V | Fillable Type | Reorderable Type |
|---|---|---|
| 0 | x | neither |
| 1 | x | x |
| 2 | y | neither |
| 3 | y | y |

The next steps of the decoding process read n, the number of vertices of the polygon:

Set n=2 (the minimum polygon).
2. Read V, the value of the next 4 message bits.
3. Increase n by V.
4. If V<15, stop; else if V=15, return to step 2.

If the polygon was found to be non-reorderable, the reading of the vertex coordinates is straightforward and in the proper clockwise order:

1. Set i=1.
2. Read V, the value of the next 6 message bits; set $x_i$=V+1.
3. Read V, the value of the next 6 message bits; set $y_i$=V+1.
4. Increment i; if i<n, return to step 2, else stop.

On the other hand, if the polygon was found to be reorderable, the order of the vertices must be unshuffled from the order they are read. Letting v and w be temporary arrays used to store the coordinates until the unshuffling has been resolved, the steps for an x-reorderable polygon become:

1. Read V, the value of the next 6 message bits; set $x_1$=V+1.
2. Read V, the value of the next 6 message bits; set $x_i = V+1$.

3. Compute $b = \log_2(64 - x_{1+1})$ rounded up to next integer.
4. If $b > 0$,
   read V, the value of the next b bits; set $v_2 = x_1 + V$.
   Else set $v_2 = x_1$.
5. Read V, the value of the next 6 message bits; set $w_2 = V + 1$.
6. If $n = 2$, set $x_2 = v_2$, $y_2 = w_2$, and stop.
7. Compute $b = \log_2(v_2 - x_1 + 1)$ rounded up to next integer.
8. If $b > 0$,
   read V, the value of the next b bits; set $v_3 = x_1 + V$.
   Else set $v_3 = x_1$.
9. Read V, the value of the next 6 message bits; set $w_3 = V + 1$.
10. Set $i = 4$.
11. While $i < n$:
    Compute $b = \log_2(v_2 - v_i - 1 + 1)$ rounded up to next integer.
    If $b > 0$,
    Read V, the value of the next b bits; set $v_i = v_{i-1} + V$.
    Else set $v_i = v_{i-1}$.
    Read V, the value of the next 6 message bits; set $w_i = V + 1$
12. Compute s0, the reference slope, defined by $$s_0 = (w_2 - y_1)/(v_2 - x_1)$$

13. Set $p = 2$, $q = n$, $i = 3$.
14. While $i < n$:
    Compute s, the slope for temporary vertex i, defined by $$s = (w_i - y_l)/(v_i - x_l)$$

If $S > S0$:
      set $x_p = v_i$, $y_p = w_i$
      increment p
    Else if $s < s_0$:
      set $x_q = v_i$, $y_q = w_i$
      decrement q
15. Set $x_p = v_2$, $y_p = w_2$.

The steps for a y-reorderable polygon are just the converse of these, that is, with x and y interchanged.

The purpose of the polygon-fill routine is to identify all points on the map that lie within the boundary of the polygon specified by the input list of vertices. For "normal" convex polygons, this process is simple. However, when concave vertices exist, or worse yet when the boundary lines of the polygon touch or even cross each other, determining just where the "inside" and the "outside" of the polygon lie can be quite complex. The initial polygon-construction routine, which traces the outside of the weather region, can never produce crossing lines. However, the vertex-reduction routine can, in some rare cases because of approximations and integer roundoffs, produce this effect.

The polygon-fill routine contains two different fill methods: a simple one that can handle only fillable polygons (as defined above) and a general one that is applicable to all cases. Since the simple routine executes much faster than the general-case routine and many real weather regions qualify as fillable, the inclusion of the additional code required by the special-case routine is justified.

The polygon-fill routine in either the simple or the general case has two steps: drawing the boundary lines, and finding the points that lie within this boundary. The procedure for drawing the boundary lines is common to both routines; the dichotomy is in the complexity of determining inside from outside. A polygon with n vertices also has n boundary lines, each extending from one vertex to the next. For the ith boundary line let:

$$\Delta^x = x_{i+1} - x_i = \text{sign}(\Delta^x)^* \ \Delta x = s_x^* d_x$$

$$\Delta^y = y_{i+1} - y_i = \text{sign}(\Delta^y)^* \ \Delta y = s_y^* d_y$$

Then the map cells r,c (row,column) on the boundary line are found according to the magnitude of the slope of the line as indicated in the following cases:

| | |
|---|---|
| 1. | $d_x = 0$: (horizontal line) |
| | $r = x_i$, $c = y_i + n^*s_y$  $n=0,d_y$ |
| 2. | $d_y = 0$: (vertical line) |
| | $c = y_i$, $r = x_i + n^*s_x$  $n=0,d_x$ |
| 3. | $d_x = d_y$: (diagonal line) |
| | $r, c = x_i + n^*sx$, $y_i + n^*s_y$  $n=0,d_x$ |
| 4. | $d_x > d_y$: (x-oblique line) |
| | $r, c = x_i + n^*s_x$, $y_i +$ $n^*s_y^*d_y/d_x$  $n = 0,d_x$ |
| | c rounded to nearest integer |
| 5. | $d_y > d_x$: (y-oblique line) |
| | $r, c = x_i + n^*s_x^*d_x/d_y$, $y_i +$ $n^*s_y$  $n = 0,d_y$ |
| | r rounded to nearest integer |

Figure 16:
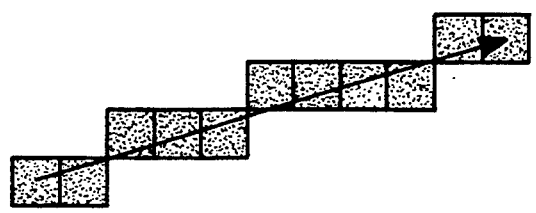
FIG. 16 is an example of a y-oblique line having an x component of its slope of −3, and y component of its slope of 10.

In the two oblique cases, one coordinate has a smaller delta than the other. Therefore, the coordinate with the smaller magnitude delta must repeat its value. For example, a sample y-oblique line, having $\Delta x = -3$, and $\Delta y = 10$, would appear as shown in FIG. 16.

Once all the points comprising the polygon boundary lines have been determined, the interior fill procedure for the simple method is relatively straightforward. By the definition of an x-fillable polygon, the filled region for a given map row, if any exists, always extends from the minimum boundary line point on that row to the maximum boundary line point point on the row. Thus, the complete fill method for the simple case consists of the following steps:

1. Initialize the minimum and maximum points for each row r to $s_r = L$ (a large number) and $b_r = -1$ respectively.
2. Draw all the boundary lines of the polygon point by point. For each point r,c (row,column) on each boundary line, redefine $b_r$ and $s_r$ by:

$$b_r = \text{Max } (b_r, r)$$

$$s_r = \text{Min } (s_r, r)$$

3. For each row r of the map, the filled region (if any) consists of the points c,
   $s_r < c < b_r$.

For a y-fillable polygon, reverse row and column and proceed in a similar manner. Polygons are therefore filled using a series of continuous, parallel, non-colinear, line segments.

When the polygon is not simple, a given row of The map may switch from "outside" to "inside" and back any number of times. The general rule is that every time a boundary line of the polygon is crossed, such a switch occurs. Three factors complicate the employment of this apparently straightforward rule: an end point of a boundary line is part of two lines; a y-oblique line has two or more points in a row that are part of that same line; and two or more lines can cross, so than the crossing point is part of both lines.

Thus, it is clear that each boundary line point must be labelled with a tag indicating the number of lines that are crossed when that point is encountered. With this information, the fill method for row r would know that when it encounters a boundary point labelled with an odd number it should switch from being inside the polygon and filling points to being outside, or vice versa; when it encounters a boundary point with an even label it should continue unchanged.

Figure 18A:
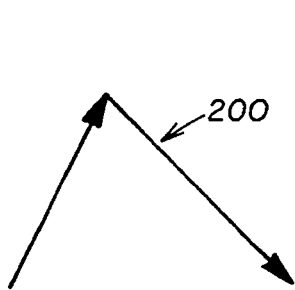
FIG. 18a is a diagram illustrating reverse joining.
Figure 18B:
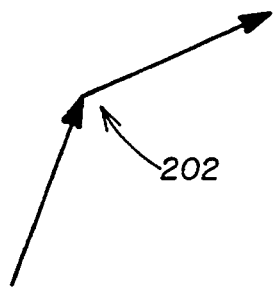
FIG. 18b is a diagram illustrating continued joining.
Figure 18C:
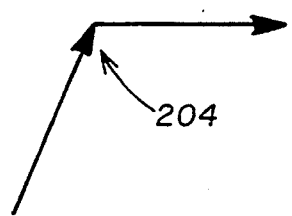
FIG. 18c is a diagram illustrating flat joining.

Even though it is easy to determine if a region changes from inside to outside when an intermediate point on a boundary line is crossed, there is some difficultly with end points. This difficulty occurs in determining the number of lines being crossed at a boundary point when one of the three complicating factors above occurs. First consider the end point of a boundary line. Three cases can exist (see FIGS. 18a–c). In the reverse joining case 200, the elbow point must be labelled with 0 crossings, as no switch from outside to inside has occurred on that row. In the continue joining case 202 on the other hand, a label of 1 is required as a switch does occur. Finally, in the flat joining case 204, the correct action can only be determined by examining the next elbow point to see whether an "extended reverse" or "extended continue" joining has occurred. Then the leftmost of the two elbow points is labelled according to the previous rule and the second elbow point is labelled with a 0 so as not to undo that action.

Next consider the problem with y-oblique lines. Although two or more points of the line can exist on the same row r, only one line is being crossed. Thus, the labelling rule to follow is that only the leftmost of the points is to be labelled; other points of the line in the same row, if any, are ignored.

Finally, the possibility of a single map point being part of two or more boundary lines because of line convergence or crossings is accommodated. Each point's label is initialized to 0 crossings; each time it is found to be part of a boundary line, the label is incremented or not according to the earlier rules. The final label will then properly indicate the number of crossings at the point.

Figure 17:
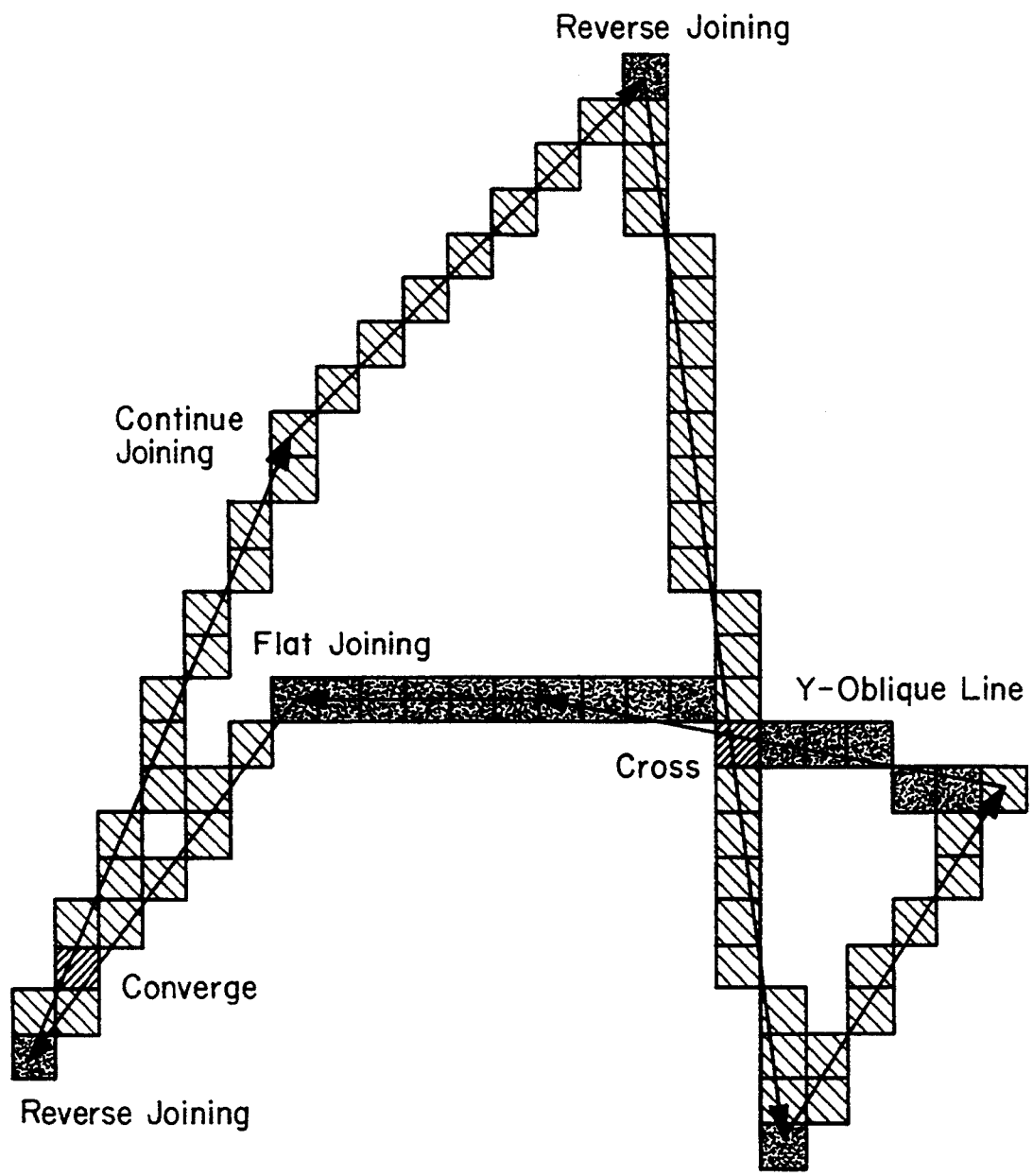
FIG. 17 is a drawing of a complex polygon illustrating fill operations according to the embodiment of FIG. 1.

An example of the label values on the boundary points of a complex polygon, illustrating the above cases, is shown in FIG. 17.

Incorporating these rules for boundary-point labelling, the general fill method can be expressed as follows:
1. Initialize the label for every point r,c (row,column) to 0.
2. Draw all the boundary lines of the polygon point by point. For each point r,c on each boundary line, decide whether or not to increment the point's label according to the following rules:
   a. Increment the first end point of a line if the end point implements a continue joining or if the end point is the left end of an extended continue joining.
   b. Increment each interior point of a line unless the point is on a horizontal or y-oblique line and the point to its left is also on the line.
   c. Do not increment the second end point of a line (it will be handled as the first end point of the next line).
3. For each row, initialize the case to "outside."
4. Scan each row from left to right. When an odd-valued labelled point is found, switch between "outside" and "inside." Fill all points when "inside" is true.

One modification to these rules is introduced to account for the presence of the "tunnels" through the polygon created. The new rule is that whenever the sequence "fill, no-fill, fill" is encountered in a row, the middle point is also filled in, thereby removing the vertical tunnels from view.

Should the input weather map be extremely complex, or the bit limitation be especially severe, it is possible that some of the lower-priority weather levels will not be allocated enough bits to separately represent their weather regions. In that case, the default minimum representation has been defined to be a single quadrilateral that encompasses all the level's weather regions.

The method chosen to construct this quadrilateral is to generate a set of vertices such that the polygon they define includes all the weather regions on the given single-level map. This set of vertices is then passed to the normal polygon reduction routine described earlier with the command that the number of vertices be cut to four. The result will be the quadrilateral that best balances representation of true weather pixels with minimization of added overfill pixels.

Figure 19A:
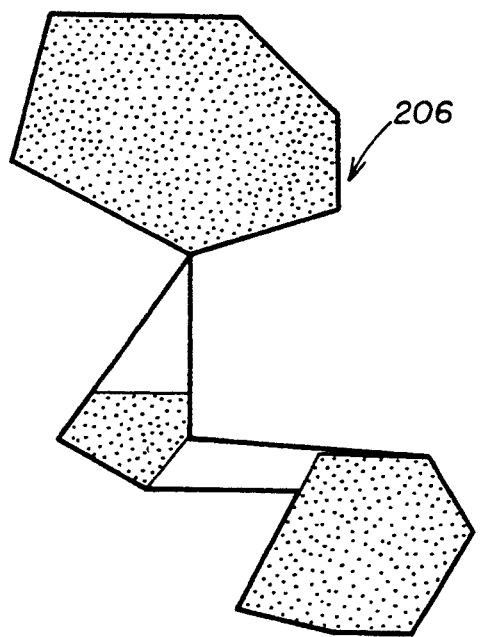
FIG. 19a is a diagrammatic representation of weather regions and an initial polygon contour according to the operation of the embodiment of FIG. 1.
Figure 19B:
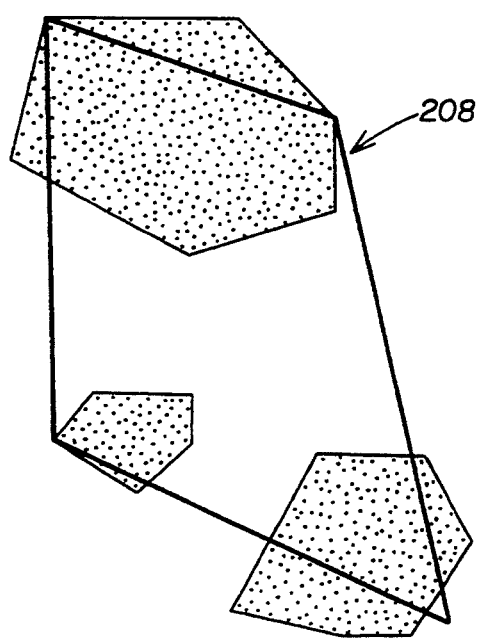
FIG. 19b is a diagrammatic representation of the weather regions of FIG. 19a fit with a quadralateral according to the operation of the embodiment of FIG. 1.

An example of the type of initial polygon it is desired to construct 206, and the resultant quadrilateral 208, shown in FIGS. 19a–19b.

In particular, a vertex of the initial polygon is to be generated at each end of any map row that contains non-zero pixel values. The map-preparation routine has already calculated these end values for each row i of level L as $min_{L,i}$ and $max_{L,i}$, with $min_{L,i} > 64$ used to indicate that row i has only zero pixel values. Thus, the clockwise vertex generation method becomes:
1. Initialize the row number to r=1.
2. If non-zero pixel values exist on row r, add a vertex at (r, $max_{L,i}$)
3. Increment r; if r≦64, return to step 2.
4. Initialize the row number to r=64.
5. If non-zero pixel values exist on row r, add a vertex at (r, $min_{L,i}$)
6. Decrement r; if r≧1, return to step 5.

The polygon-reduction routine also needs to know the area of the region encompassed by this polygon. Using the trapezoidal-area formula, each row i having non-zero pixel values, after the first such row, adds to the area an amount:

$$\Delta area = \tfrac{1}{2} * ((max_i - min_i) + (max_k - min_k)) * (i-k)$$

where k is the previous row having non-zero pixel values. In the default case of only one row i having non-zero pixel values, $$area = max_i - min_i$$

The quadrilateral is not considered to be a separate shape; rather, it is treated as just a polygon that happens to always have 4 vertices. Thus, the encoding scheme for a quadrilateral is exactly the same as presented earlier for polygons. In particular, it must be classified as fillable or not, and reorderable or not, and the proper encoding method utilized.

Once again, a quadrilateral is treated exactly the same as any other polygon by the decoder. In fact, the decoder won't be able to determine whether a 4-vertex polygon is simply representing a single weather region on the level or the entire weather level. Depending upon whether the quadrilateral is fillable or not, either of the earlier presented fill procedures could be employed for it.

In some applications, it may be desirable to send fewer than the maximum number of weather levels. For example, commercial aircraft will stay away from several of the higher levels of weather and may not need to differentiate between these levels. The first number (e.g., 3 bit) sent in the transmission, therefore can represent the number of levels transmitted.

Polygon objects (whether they are reorderable or not) whose vertices have been decoded in reduced resolution must be rescaled to full resolution before they are plotted and filled onto the output map array. Simply multiplying all the vertex coordinates by 2 (as was done for ellipse objects) leads to some 1-pixel shifts in position of some polygon objects due to the rounding and truncation of integer arithmetic. The improved polygon-ellipse method deals with these position shifts by first computing the average x and y value for the reduced resolution polygon object vertices. The decoder then rounds down all vertex coordinates that are less than the average while not rounding vertex coordinates that are larger than the average.

Each of the user-settable parameters used in the improved PE software are now presented. The default value of each parameter, as are the performance effects of changes to other legal values.

Map Bit Limit (b limm) Default=1280

This parameter is the maximum allowable number of bits that can be used to encode the weather map. Changing the setting will increase or decrease the distortion produced in the map representation.

Level Renumbering (remap flag) Default=0

This parameter specifies whether the standard weather level numbering scheme should be revised. The meanings of the possible values are:

0=no renumbering of weather levels
1=renumber the weather levels—the user must enter in order the new numbers for levels 1 through 6 into remap[6].

The remapping feature is useful when fewer than 7 levels of weather are desired on the output display. For example, a 3-level display—no weather, rain, storms—would be produced by entering 1 followed by the 6 values 1,1,2,2,2,2.

Level Priority Ordering (levtype) Default=0

This parameter specifies the type of level priority ordering to be used in the encoding logic when distortion must be introduced. The meanings of the possible values are:

0="normal"—level 1 lowest priority, level 6 highest priority
1="reversed"—level 6 lowest priority, level 1 highest priority
2="user-ordered"—the user must enter the 6 levels in order from lowest priority to highest priority into in_maplev[6].

When distortion is required, the levels are degraded in order from lowest to highest priority.

Minimum Region Size (thresh[6]) Default=6,3,1,1,1,1

These parameters specify, for each level 1 through 6, the smallest weather region that will be encoded. If the values are decreased, more weather "spots" will be maintained on the output map; if they are increased, the larger regions will be more faithfully represented as more bits are freed up. These thresholds also apply to minimum-size hole representations on the levels, except that no hole of size less than 6 will ever be encoded.

Highest Hole Level (high hole) Default=6

This parameter specifies the highest level for which holes in weather regions (areas of less severe weather within a weather region) will be maintained by the encoding method. By reducing the value, holes in severe weather regions will be ignored; this will free up more bits for accurate representation of weather regions.

Initial Distortion (init dist) Default=0%

This parameter specifies how much polygon distortion will be accepted on the first pass through the encoding method. If set to 0, an attempt at the best possible representation will be made; if set higher, processing time will be saved for complex maps as fewer iterations through the distortion sequence will be required before the bit limit is satisfied.

Polygon Angle Breaks (a small, o small) Default=20°, 30°

These parameters control when, in the tracing of the line segments in the contour of a weather region, a new polygon side is initiated. As long as the newest segment direction differs by less than a_small degrees from the present direction of the current side, and less than o—small degrees from the initial direction of the current side, the segment is added to the current side to produce a longer side. Decreasing these values will produce more accurate polygon representations for simple maps, but more region distortion and more processing time for complex maps.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A method of displaying weather patterns on a display, including:
   receiving an encoded signal representing weather data produced by weather radar, said weather data including polygon perimeter information and an indication that indicates whether said polygon perimeter information includes a series of shuffled vertex coordinates having varying storage requirements and uniquely defining a polygon, and
   in response to an indication that said polygon perimeter information includes said series of shuffled vertex coordinates, determining from said series of vertex coordinates the positions of the sides of the shuffled polygon, and
   displaying the polygon on the display.

2. The method of claim 1 wherein said step of receiving receives the shuffled vertex coordinates organized in pairs of two coordinate types and wherein the shuffled vertex coordinates of one of said types are encoded with varying length storage requirements.

3. The method of claim 1 wherein said step of receiving receives the shuffled vertex coordinates organized in pairs of two coordinate types and wherein shuffled vertex coordinates of one of said types are encoded with varying length storage requirements, said one of said coordinate types having a range for said polygon, said series of shuffled vertex coordinates starting with the pairs of coordinates in said range having the highest and lowest values in said range of said one of said coordinate types.

4. A method of displaying weather patterns on a display, including:

receiving an encoded signal representing weather data produced by weather radar, said weather data including polygon perimeter information and an indication that indicates whether said polygon perimeter information represents a continuous segment fillable polygon, in response to an indication that said polygon perimeter information represents a continuous segment fillable polygon, filling said polygon with a series of parallel non-colinear continuous line segments, and wherein said indication distinguishes between a plurality of types of continuous segment fillable polygons, and wherein said step of filling fills said polygons with a series of said segments oriented in a manner corresponding to the type indicated in the indication received in said step of receiving.

5. The method of claim 4 wherein said types include horizontally-fillable and vertically-fillable polygons.

6. A method of transmitting weather maps, including:

receiving weather data produced by weather radar defining weather regions, generating a polygonal representation of one of said weather regions, for a set of two vertices defining the ends of a sequence of three sides of the polygonal representation, determining the position of a new vertex that defines, in combination with the set of two vertices, two replacement sides for the sequence, the position of the vertex minimizing a measure of change in area of the polygonal representation when the three sides are replaced with the two replacement sides, determining the position of further new vertices for further sets of two vertices, replacing the sequence of three sides corresponding to the one of the new vertices that results in the lowest level of the measure of change in area with the two replacement sides corresponding to said one of the new vertices, and transmitting the polygonal representation that includes said one of the new vertices over a communications channel.

7. The method of claim 6 wherein the measure of change in area is an approximation determined by the areas of triangles defined by the three sides and the two replacement sides.

8. The method of claim 6 wherein the step of determining the position of the new vertex differs depending on which of a convex, concave, and convex-concave shapes the three sides define.

9. A method of transmitting weather maps produced by weather radar, comprising:

representing a series of regions within the weather maps as elliptical approximations of the weather regions, each said elliptical approximation having a plurality of parameters of a plurality of types defining the elliptical representation, representing some of the parameters of one of the types with shorter signal lengths than other of the parameters of the same type, and transmitting parameters of the elliptical representations in an order dependent on the values of the parameters of the elliptical representation.

10. A method of displaying weather maps produced by weather radar on a display, comprising:

receiving a signal stream including a series of signals of differing lengths, said signals defining a series of elliptical approximations each representing a region within the weather map, each said elliptical approximation having a plurality of parameters of a plurality of types defining the elliptical approximation, delimiting the signals from the signal stream based on values of previously received parameters from the signal stream, and displaying said elliptical approximations based on the signals defining said elliptical approximations.

11. The method of claim 10 wherein the step of delimiting parameters is based on a distance parameter, which is the distance from the first focus to any point on the boundary and then on to the second focus, for that elliptical approximation.

12. The method of claim 10 wherein the step of delimiting parameters is based on the value of a coordinate of two focuses of each of the elliptical representations.

13. A method of transmitting weather maps produced by weather radar, comprising:

receiving weather data including weather regions, said weather regions having an area and a plurality of moments of inertia, and measuring the ellipseticity of weather regions defined by said weather data by comparing said moments of inertia of each said region with said area of each said region, determining whether to represent each said region with a signal including an elliptical approximation or with a signal representing another type of representation based on said step of measuring, and transmitting one of said signals, based on said step of determining, over a communications channel.

* * * * *